(12) United States Patent
Lee

(10) Patent No.: US 11,683,558 B2
(45) Date of Patent: Jun. 20, 2023

(54) METHODS AND APPARATUS TO DETERMINE THE SPEED-UP OF MEDIA PROGRAMS USING SPEECH RECOGNITION

(71) Applicant: The Nielsen Company (US), LLC, New York, NY (US)

(72) Inventor: Morris Lee, Palm Harbor, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

(21) Appl. No.: 17/565,349

(22) Filed: Dec. 29, 2021

(65) Prior Publication Data

US 2022/0417588 A1  Dec. 29, 2022

Related U.S. Application Data

(60) Provisional application No. 63/216,372, filed on Jun. 29, 2021.

(51) Int. Cl.
*H04N 21/439* (2011.01)
*G10L 15/22* (2006.01)
*G10L 15/08* (2006.01)
*H04N 21/442* (2011.01)

(52) U.S. Cl.
CPC ....... *H04N 21/4394* (2013.01); *G10L 15/083* (2013.01); *G10L 15/22* (2013.01); *H04N 21/44204* (2013.01)

(58) Field of Classification Search
CPC .......... H04N 21/4394; H04N 21/44204; G10L 15/083; G10L 15/22
See application file for complete search history.

(56) References Cited

U.S. PATENT DOCUMENTS

| | | | | |
|---|---|---|---|---|
| 4,570,232 A | * | 2/1986 | Shikano | G10L 15/12 704/241 |
| 5,598,557 A | * | 1/1997 | Doner | G06F 16/3346 707/999.005 |
| 6,085,160 A | * | 7/2000 | D'hoore | G10L 15/005 704/277 |
| 6,186,834 B1 | * | 2/2001 | Arnett | H01R 13/6464 439/676 |
| 6,188,987 B1 | * | 2/2001 | Fielder | H04N 21/4341 704/229 |
| 6,442,518 B1 | * | 8/2002 | Van Thong | G10L 15/26 704/235 |

(Continued)

*Primary Examiner* — Michael B. Pierorazio
(74) *Attorney, Agent, or Firm* — Hanley, Flight & Zimmerman, LLC

(57) ABSTRACT

Methods, apparatus, systems and articles of manufacture are disclosed to determine the speed-up of media programs using speech recognition. An example apparatus disclosed herein is to perform speech recognition on a first audio clip collected by a media meter to recognize a first text string associated with the first audio clip, compare the first text string to a plurality of reference text strings associated with a corresponding plurality of reference audio clips to identify a matched one of the reference text strings, and estimate a presentation rate of the first audio clip based on a first time associated with the first audio clip and a second time associated with a first one of the reference audio clips corresponding to the matched one of the reference text strings.

18 Claims, 9 Drawing Sheets

(56) References Cited

U.S. PATENT DOCUMENTS

| | | | | |
|---|---|---|---|---|
| 6,473,778 B1* | 10/2002 | Gibbon | G06F 40/103 | 715/201 |
| 7,047,191 B2* | 5/2006 | Lange | G10L 15/26 | 704/235 |
| 7,065,524 B1* | 6/2006 | Lee | G06Q 40/08 | 706/45 |
| 7,092,888 B1* | 8/2006 | McCarthy | G10L 15/063 | 704/277 |
| 7,509,385 B1* | 3/2009 | Rittmeyer | G06Q 10/107 | 715/224 |
| 7,729,917 B2* | 6/2010 | Miyamoto | G10L 15/22 | 704/275 |
| 7,739,253 B1* | 6/2010 | Yanovsky | G06F 16/9535 | 707/706 |
| 7,801,910 B2* | 9/2010 | Houh | G06F 16/583 | 707/765 |
| 7,962,331 B2* | 6/2011 | Miller | G10L 15/01 | 704/235 |
| 8,121,432 B2* | 2/2012 | Dorai | G06F 16/7844 | 382/276 |
| 8,131,545 B1* | 3/2012 | Moreno | G10L 15/04 | 704/235 |
| 8,423,363 B2* | 4/2013 | Gupta | G10L 15/22 | 704/251 |
| 8,572,488 B2* | 10/2013 | Phillips | G06F 16/7834 | 715/716 |
| 10,380,166 B2 | 8/2019 | Lee | | |
| 2002/0055950 A1* | 5/2002 | Witteman | G06F 16/40 | 707/E17.009 |
| 2002/0093591 A1* | 7/2002 | Gong | G06F 16/739 | 348/E7.063 |
| 2003/0025832 A1* | 2/2003 | Swart | H04N 21/234309 | 348/E7.071 |
| 2003/0061028 A1* | 3/2003 | Dey | G06F 16/40 | 704/9 |
| 2003/0169366 A1* | 9/2003 | Lenzi | H04N 7/10 | 348/461 |
| 2003/0206717 A1* | 11/2003 | Yogeshwar | G06F 16/71 | 386/328 |
| 2004/0096110 A1* | 5/2004 | Yogeshwar | G06F 16/51 | 707/E17.031 |
| 2005/0227614 A1* | 10/2005 | Hosking | H04N 7/165 | 455/3.06 |
| 2006/0015339 A1* | 1/2006 | Charlesworth | G10L 15/187 | 704/E15.02 |
| 2006/0248073 A1* | 11/2006 | Jones | G06F 16/3328 | 707/999.005 |
| 2007/0011012 A1* | 1/2007 | Yurick | G10L 15/26 | 704/277 |
| 2007/0124147 A1* | 5/2007 | Gopinath | G10L 15/19 | 704/E15.021 |
| 2007/0124756 A1* | 5/2007 | Covell | H04N 21/858 | 348/E7.071 |
| 2007/0124788 A1* | 5/2007 | Wittkoter | H04N 7/165 | 348/E7.071 |
| 2007/0214164 A1* | 9/2007 | MacLennan | G06F 16/90 | |
| 2008/0066138 A1* | 3/2008 | Bishop | G06F 40/58 | 725/137 |
| 2008/0166106 A1* | 7/2008 | Ozawa | H04N 21/4884 | 386/245 |
| 2008/0255844 A1* | 10/2008 | Wu | G10L 15/193 | 704/E15.022 |
| 2008/0266449 A1* | 10/2008 | Rathod | H04N 21/8133 | 348/E7.001 |
| 2008/0270134 A1* | 10/2008 | Miyamoto | H04N 7/0885 | 348/E7.001 |
| 2009/0171662 A1* | 7/2009 | Huang | G10L 15/1822 | 704/E15.041 |
| 2010/0091187 A1* | 4/2010 | Topiwalla | H04N 21/4355 | 348/E7.003 |
| 2011/0022386 A1* | 1/2011 | Gatzke | G10L 15/26 | 704/235 |
| 2011/0040559 A1* | 2/2011 | Kim | G10L 15/26 | 704/271 |
| 2012/0101817 A1* | 4/2012 | Mocenigo | G10L 15/063 | 704/E15.001 |
| 2012/0253799 A1* | 10/2012 | Bangalore | G10L 15/183 | 704/E15.001 |
| 2016/0007054 A1* | 1/2016 | Polumbus | H04N 21/2665 | 725/116 |

* cited by examiner

```
query_min 42.75|result_min 44.25|score 99.7 ***************************************** 1.03509
query_min 45.50|result_min 47.25|score 59.4 ***************************************** 1.03846
query_min 45.75|result_min 47.50|score 49.8 ***************************************** 1.03825
query_min 46.00|result_min 48.00|score 45.1 ***************************************** 1.04348
query_min 46.25|result_min 48.00|score 47.2 ***************************************** 1.03784
```

FIG. 3

METHODS AND APPARATUS TO DETERMINE THE SPEED-UP OF MEDIA PROGRAMS USING SPEECH RECOGNITION

RELATED APPLICATION

This patent claims the benefit of U.S. Provisional Patent Application No. 63/216,372, which was filed on Jun. 29, 2021. U.S. Provisional Patent Application No. 63/216,372 is hereby incorporated herein by reference in its entirety. Priority to U.S. Provisional Patent Application No. 63/216,372 is hereby claimed.

FIELD OF THE DISCLOSURE

This disclosure relates generally to media identification systems, and, more particularly, to methods and apparatus to determine the speed-up of media programs using speech recognition.

BACKGROUND

A media monitoring entity can generate audio signatures from a media signal. Audio signatures are a condensed reference that can be used to subsequently identify the media. These signatures can be hashed to allow faster matching in an audio signature database. In some examples, a media monitoring entity can monitor a media source feed (e.g., a television feed, etc.) to generate reference signatures representative of media presented via that media source feed. Such reference signatures can be compared to signatures generated by media monitors to credit viewership of the media.

BRIEF DESCRIPTION OF THE DRAWINGS

FIG. 3 illustrates example speed-up data of a media asset at a presentation rate compared to queried media assets.

The figures are not to scale. In general, the same reference numbers will be used throughout the drawing(s) and accompanying written description to refer to the same or like parts.

Figure 1:
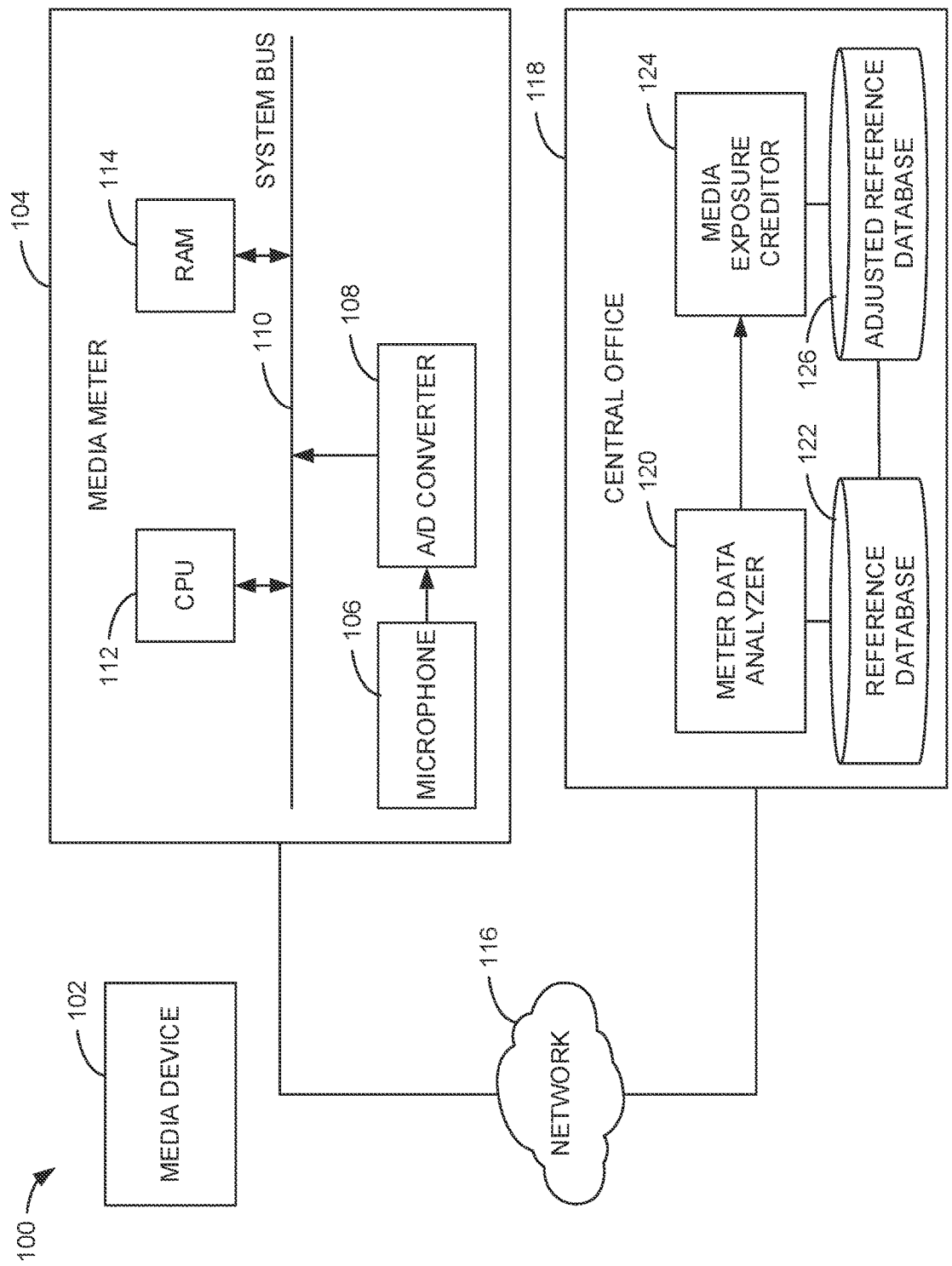
FIG. 1 is a block diagram of an example environment in which the teachings of this disclosure may be implemented.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

DETAILED DESCRIPTION

As used herein, the term "media" includes any type of content and/or advertisement delivered via any type of distribution medium. Thus, media includes television programming or advertisements, radio programming or advertisements, podcasts, movies, web sites, streaming media, etc.

Example methods, apparatus, and articles of manufacture disclosed herein monitor media presentations at media devices. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc.

In some examples, media monitoring information is aggregated to determine ownership and/or usage statistics of media devices, determine the media presented by the media devices, determine audience ratings, determine relative rankings of usage and/or ownership of media devices, determine types of uses of media devices (e.g., whether a device is used for browsing the Internet, streaming media from the Internet, etc.), and/or determine other types of media device information. In examples disclosed herein, monitoring information includes, but is not limited to, one or more of media identifying information (e.g., media-identifying metadata, codes, signatures, watermarks, and/or other information that may be used to identify presented media), application usage information (e.g., an identifier of an application, a time and/or duration of use of the application, a rating of the application, etc.), identifying information (e.g., demographic information, a user identifier, a panelist identifier, a username, etc.), etc.

Audio watermarking is a technique used to identify media, such as television broadcasts, radio broadcasts, advertisements (television and/or radio), downloaded media, streaming media, prepackaged media, etc. Some audio watermarking techniques identify media by embedding one or more audio codes (e.g., one or more watermarks), such as media identifying information and/or an identifier that may be mapped to media identifying information, into an audio and/or video component of the media. In some examples, the watermark is embedded in the audio or video component so that the watermark is hidden. This embedding may be carried out utilizing psychoacoustic masking.

As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header).

To identify watermarked media, the watermark(s) are extracted and used to access a table of reference watermarks that are mapped to media identifying information. In some examples, media monitoring companies provide watermarks and/or watermarking devices to media providers with which to encode their media source feeds. In some examples, if a media provider provides multiple media source feeds (e.g., ESPN and ESPN 2, etc.), a media provider can provide a different watermark for each media source feed.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a time interval. A good signature is repeatable when processing the same media presentation, but is unique relative to other (e.g., different) presentations of other (e.g., different) media. Accordingly, the terms "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more reference signatures corresponding to known (e.g., reference) media source feeds. Various comparison criteria, such as a cross-correlation value, a Hamming distance, etc., can be evaluated to determine whether a monitored signature matches a particular reference signature. When a match between the monitored signature and a reference signatures is found, the monitored media can be identified as corresponding to the particular reference media represented by the reference signature that matched the monitored signature. In some examples, signature matching is based on sequences of signatures such that, when a match between a sequence of monitored signatures and a sequence of reference signatures is found, the monitored media can be identified as corresponding to the particular reference media represented by the sequence of reference signatures that matched the sequence of monitored signatures. Because attributes, such as an identifier of the media, a presentation time, a broadcast channel, etc., are collected for the reference signature, these attributes may then be associated with the monitored media whose monitored signature(s) matched the reference signature(s). Example systems for identifying media based on codes and/or signatures are long known and were first disclosed in Thomas, U.S. Pat. No. 5,481,294, which is hereby incorporated by reference in its entirety.

Media monitoring entities (e.g., The Nielsen Company (US), LLC, etc.) desire knowledge regarding how users interact with media devices such as smartphones, tablets, laptops, smart televisions, etc. In some examples, media monitoring entities monitor media presentations made at the media devices to, among other things, monitor exposure to advertisements, determine advertisement effectiveness, determine user behavior, identify purchasing behavior associated with various demographics, etc. Media monitoring entities can provide media meters to people (e.g., panelists) which can generate media monitoring data based on the media exposure of those users. Such media meters can be associated with a specific media device (e.g., a television, a mobile phone, a computer, etc.) and/or a specific person (e.g., a portable meter, etc.).

Media monitoring entities can generate media reference databases that can include unhashed signatures, hashed signatures, and watermarks. These references are generated by a media monitoring entity (e.g., at a media monitoring station (MMS), etc.) by monitoring a media source feed, identifying any encoded watermarks and determining signatures associated with the media source feed. In some examples, the media monitoring entity can hash the determined signatures. Additionally or alternatively, the media monitoring entities generate reference signatures for downloaded reference media (e.g., from a streaming media provider), reference media transmitted to the media monitoring entity from one or more media providers, etc. That is, the media monitoring entities can generate reference signatures of media that is not live broadcasted. In some examples, media that is not live broadcasted includes a subscription video on demand (SVOD) asset. As used herein, a "media asset" refers to any individual, collection, or portion/piece of media of interest (e.g., a commercial, a song, a movie, an episode of television show, etc.). Media assets can be identified via unique media identifiers (e.g., a name of the media asset, a metadata tag, etc.). Media assets can be presented by any type of media presentation method (e.g., via streaming, via live broadcast, from a physical medium, etc.).

The reference database can be compared (e.g., matched, etc.) to media monitoring data (e.g., watermarks, unhashed signatures, hashed signatures, etc.) gathered by media meter (s) to allow crediting of media exposure. Monitored media can be credited using one, or a combination, of watermarks, unhashed signatures, and hashed signatures. If the presentation rate of a media asset is different from the original presentation rate (e.g., sped up, slowed down), the monitored signatures may not match the corresponding reference signatures of the media asset and, thus, generate a false negative. As used herein, a "presentation rate" refers to the speed of the media being presented. For example, a television show (e.g., "The Crown" on Netflix) can be sped up by 4.3% (or some other value) with respect to the original presentation rate. Speeding up and/or slowing down a presentation rate may be beneficial for having a media asset be presented in a desired amount of time. For example, if a media asset was twenty one minutes in length, but a desired amount of time was twenty minutes, the media presentation rate may be increased (e.g., sped up) to accommodate the desired twenty minute presentation time, as opposed to removing and/or not presenting one minute of the media. In some examples, the speeding up and/or slowing down of a presentation rate may also be due to a video format conversion. In some examples, such altering of the presentation rate of the media may be a result of a media presentation entity (e.g., a streaming service). In some examples, such an alteration of the presentation rate may be at the request of a user.

As noted above, an adjusted presentation rate may result in false negative identifications of a media asset. As used herein, a "false negative" refers to incorrectly not crediting a media exposure to a reference media asset that was actually being presented to the panelist. To prevent incorrect crediting caused by changes to the presentation rate of media assets, methods, apparatus, and systems disclosed herein determine the speed-up of media programs using speech recognition.

Although examples disclosed herein include determining whether the presentation rate of a media asset is sped up with respect to the original presentation rate, examples disclosed herein are not limited thereto. For example, the presentation rate of the media asset can be slowed down with respect to the original presentation rate.

In some examples, media monitoring entities store generated reference databases and gathered monitoring data on cloud storage services (e.g., AMAZON WEB SERVICES®, etc.). To allow the crediting of time-shifted viewing (e.g., viewing media via a digital video recorder (DVR), etc.), the stored references are retained for a period time after the initial presentation of the media.

Methods and apparatus disclosed herein determine the speed-up of media programs using speech recognition. Example systems for tagging/coding media using multiple features (e.g., audio features, image features, etc.) are known and were disclosed in Lee, U.S. Pat. No. 10,380,166, which is hereby incorporated by reference in its entirety. Example techniques disclosed herein include applying speech recognition techniques on audio data corresponding to the monitored media. Some disclosed example techniques include applying the speech recognition techniques on short audio clips (e.g., 30 second clips staggered by a 15 second offset) from the audio data. Some disclosed example techniques include applying the speech recognition techniques on the short audio clips of the audio data corresponding to the monitored media (sped-up content) and on corresponding short audio clips of audio data corresponding to reference media assets (original content). Some disclosed example techniques include applying the speech recognition techniques on the short audio clips of the audio data corresponding to the monitored media and obtaining closed caption text corresponding to the reference media assets. Disclosed example techniques include determining a phrase from the audio text of the short audio clips corresponding to the monitored media and querying the audio text of the short audio clips corresponding to the reference media assets. Disclosed example techniques further include comparing the time at which the phrase was detected in the audio text of the short audio clips corresponding to the monitored media to the time at which the corresponding phrase was detected in the audio text of the short audio clips corresponding to the reference media asset. Disclosed example techniques include using the comparison of the times of the phrase in the audio data corresponding to the monitored media and the audio data corresponding to the reference media asset to determine a presentation rate of the media asset corresponding to the monitored media. Disclosed example techniques include crediting the monitored media presentation to a reference media asset based on the determination of the presentation rate.

FIG. 1 is a block diagram of an example environment 100 in which the teachings of this disclosure may be implemented. The example environment 100 includes an example media device 102, an example media meter 104, an example network 116, and an example central office 118. The example media meter 104 includes an example microphone 106, an example analog-to-digital (A/D) converter 108, an example system bus 110, an example central processing unit (CPU) 112, and example random-access memory (RAM) 114. The example central office 118 includes an example meter data analyzer 120, an example reference database 122, an example media exposure creditor 124, and an example adjusted reference database 126.

In the illustrated example of FIG. 1, the example media device 102 receives media from a media source (e.g., a cable media service provider, an Internet based provider, etc.), and presents the media. The example media meter 104 collects media monitoring information from the presented media on the example media device 102. In some examples, the media meter 104 is associated with (e.g., installed on, coupled to, etc.) a respective media device. For example, the media device 102 associated with the media meter 104 presents media (e.g., via a display, etc.). In some examples, the media device 102 associated with media meter 104 additionally or alternatively presents the media on separate media presentation equipment (e.g., speakers, a display, etc.). For example, the media device 102 associated with media meter 104 can include a personal computer, an Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™, etc.), digital media players (e.g., a Roku® media player, a Slingbox®, a Tivo®, etc.), televisions, desktop computers, laptop computers, servers, etc. In such examples, the media meter 104 may have a direct connection (e.g., a physical connection) to the devices to be monitored (e.g., the media device 102), and/or may be connected wirelessly (e.g., via Wi-Fi, via Bluetooth, etc.) to the devices to be monitored.

Additionally or alternatively, in some examples, the media meter 104 is a portable meter carried by one or more individual people (e.g., panelists). In the illustrated example, the media meter 104 monitors media presented to one or more people associated with the media meter 104 and generates monitoring data. In examples disclosed herein, the media meter 104 generates the monitoring data (e.g., audio data, etc.) from the media presentation.

In some examples, monitoring data generated by the media meter 104 can additionally include watermarks detected in presented media. Such detected watermarks may be referred to as monitored media watermarks or monitored watermarks as they are detected in media monitored by the media meter 104. In some examples, the media meter 104 can determine signatures associated with the presented media. For example, the media meter 104 determines signatures (e.g., generates signatures, creates signatures, etc.) representative of media presented on the media device 102. Such signatures may be referred to as monitored media signatures or monitored signatures as they are determined from media monitored by the media meter 104. Accordingly, the monitoring data can include monitored media signatures and/or monitored media watermarks representative of the media monitored by the media meter 104. In some examples, the monitoring data is associated with a discrete, measurement time period (e.g., five minutes, ten minutes, etc.). In such examples, the monitoring data can include sequences of monitored media signatures and/or sequences of monitored media watermarks associated media asset(s) (or portions thereof) presented by the media device 102 monitored by the media meter 104.

In some examples, the monitoring data varies with the presentation rate of the monitored media. For example, the time at which different sounds/phrases occurs can change with the presentation rate. In examples disclosed herein, the presentation rate changes the timing of phrases in the audio data. For example, increasing the presentation rate of audio data relative to a reference version of the audio data shifts the timestamps of the phrases/sounds included in the audio data.

In the illustrated example of FIG. 1, the media meter 104 includes the example microphone 106 to collect audio data. In some examples, the example microphone 106 records samples of audio data of the environment 100 and provides the audio data to the media meter 104. The example microphone 106 receives ambient sound (e.g., free field audio) including audible media and/or audience sounds from the audience members in the vicinity of the media meter 104. Additionally or alternatively, the example microphone 106 may be implemented by a line input connection. The line input connection may allow an external microphone to be used with the media meter 104 and/or, in some examples, may enable the microphone 106 to be directly connected to an output of a media device 102 (e.g., an auxiliary output of a television, an auxiliary output of an audio/video receiver of a home entertainment system, etc.). In some examples, the media meter 104 is positioned in a location such that the microphone 106 receives ambient audio produced by the media device 102 and/or other devices of the environment 100 (not illustrated) with sufficient quality to identify media presented by the media device 102 and/or other devices of the environment 100 (e.g., a surround sound speaker system).

In the illustrated example, the example A/D converter 108 obtains the audio data recorded by the microphone 106. The example A/D converter 108 converts the audio data into digital audio data. In the illustrated example of FIG. 1, the example CPU 112 is hardware. For example, the CPU 112 can be implemented by one or more integrated circuits, logic circuits, microprocessors, or controllers from any desired family or manufacturer. The hardware processor may be a semiconductor based (e.g., silicon based) device. In some examples, the CPU 112 implements the example A/D converter 108.

In the illustrated example of FIG. 1, the CPU 112 of the illustrated example is in communication with a main memory including the RAM 114 via the system bus 110. The RAM 114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. Additionally or alternatively, the RAM 114 may be implemented by flash memory and/or any other desired type of memory device. Access to the RAM 114 is controlled by a memory controller.

The example network 116 receives monitoring data (e.g., monitored media audio data, monitored media watermarks, monitored media signatures, etc.) from the media meter 104. The example network 116 transmits the monitoring data to the central office 118. In some examples, the network 116 can be the Internet and/or any other suitable external network. In some examples, the example network 116 can be absent. In such examples, the media meter 104 can be in direct communication with the meter data analyzer 120 of the central office 118. For example, if the meter data analyzer 120 is implemented via a cloud service, the media meter 104 can directly upload the monitoring data to the cloud service.

The example central office 118 is an execution environment used to implement the example meter data analyzer 120 and the example media exposure creditor 124. In some examples, the central office 118 is associated with a media monitoring entity. In some examples, the central office 118 can be a physical processing center (e.g., a central facility of the media monitoring entity, etc.). Additionally or alternatively, the central office 118 can be implemented via a cloud service (e.g., Amazon Web Services™ etc.). In this example, the central office 110 can further store and process generated watermark, signature, and audio reference data.

In the illustrated example, the meter data analyzer 120 processes the gathered media monitoring audio data to determine a presentation rate associated with the corresponding monitoring data. For example, the meter data analyzer 120 obtains monitored audio data. The example meter data analyzer 120 determines the presentation rate of the monitored media based on the monitored audio data. The example meter data analyzer 120 determines audio matches between the monitored audio data and the reference audio data to determine the presentation rate. In some examples, the meter data analyzer 120 determines the presentation rate for the monitored media to adjust the reference signature generation procedure for the monitored media. An example implementation of the meter data analyzer 120 is described below in connection with FIG. 2. The example meter data analyzer 120 transmits the example monitoring data (e.g., monitored media audio data, monitored media watermarks, monitored media signatures, etc.) and the determined presentation rate to the example media exposure creditor 124.

The example reference database 122 includes reference signatures, reference watermarks, and other reference data created or otherwise obtained by the central office 118 to be used to identify and/or represent the reference media assets. In some examples, the media monitoring entity associated with the reference database 122 can directly monitor media source feeds to generate reference signatures. Additionally or alternatively, the media monitoring entity associated with the reference database 122 can generate reference signatures from downloaded reference media, etc. In examples disclosed herein, reference signatures are generated using the same or similar techniques as the monitored media signatures, such that the monitored media signatures and reference signatures of the same asset match. In some examples, each reference signature stored in the reference database 122 is associated with a specific reference media asset, such as, but not limited to, episodes of television programs (e.g., episodes of The Crown, Game of Thrones, The Office, etc.), movies of a movie collection (e.g., The Marvel Cinematic Universe, etc.), etc.

Additionally or alternatively, the reference database 122 stores reference audio data associated with the reference signatures. In some examples, each reference signature and associated reference audio data stored in the reference database 122 is associated with a timestamp, which indicates a time each reference signature and associated reference audio data was generated for the reference media. In some examples, the reference database 122 can include a library (e.g., database, table, etc.) of reference signature streams. In some examples, the reference database 122 includes reference signatures and associated reference audio data that correspond to reference signatures and reference audio data of media assets at the original presentation rate. In some examples, the reference database 122 also include reference text string and/or closed caption text associated with the reference audio data.

The example media creditor 124 of FIG. 1 processes the gathered media monitoring data and the presentation rate data to detect, identify, credit, etc., respective media assets and/or portions thereof (e.g., media segments) associated with the corresponding monitoring data from the example meter data analyzer 120. The example media exposure creditor 124 uses the media monitoring data and presentation rate data from the example meter data analyzer 120 to credit the media exposure to user(s) associated with the media meter 104. In some examples, the media exposure creditor 124 receives identification data from the example meter data analyzer 120 identifying a reference media asset that matched the media monitoring data. In some examples, the media exposure creditor 124 uses the presentation rate data and the identification data from the example meter data analyzer 120 to create an adjusted reference media asset with the presentation rate data. For example, the media exposure creditor 124 applies the presentation rate data to the reference signatures and/or reference watermarks from the reference media asset at the original presentation rate and creates the corresponding adjusted reference media asset with reference signatures and/or reference watermarks that are adjusted with the determined presentation rate from the example meter data analyzer 120.

In some examples, after the media exposure creditor 124 creates an adjusted reference media asset based on the presentation rate data from the example meter data analyzer 120, the example media exposure creditor can credit exposure to the media assets that was sped up, slowed down, etc. using matching techniques with the adjusted reference media asset. The example media exposure creditor 124 can compare the monitoring data to the generated reference data (including the created adjusted reference data) stored in the adjusted reference database 126 to determine what respective media is associated with the corresponding monitoring data. In some examples, the media exposure creditor 124 can hash the signatures included in the monitoring data. In some examples, the media exposure creditor 124 can identify the media by matching unhashed signatures and/or hashed signatures. The media exposure creditor 124 of the illustrated example also analyzes the monitoring data to determine if the media asset(s), and/or particular portion(s) (e.g., segment (s)) thereof, associated with the signature match is (are) to be credited. For example, the media exposure creditor 124 can compare monitored media signatures in the monitoring data to the library of generated reference signatures in the adjusted reference database 126 to determine the media asset(s) associated with the monitored media signatures. In examples disclosed herein, the media exposure creditor 124 can determine the media asset(s) associated with the monitored media signatures even if the monitored media signatures are sped up, slowed down, etc. by accessing adjusted reference signatures that were adjusted based on the presentation rate of the monitored media signatures determined by the example meter data analyzer 120. In some examples, the example media exposure creditor 124 credits the reference media asset associated with the monitoring data that was sped up, slowed down, etc. (e.g., the adjusted reference media asset). In some examples, the media exposure creditor 124 generates a report including data metrics regarding media exposure events that may be presented to media providers.

The example adjusted reference database 126 includes generated reference signatures created or otherwise obtained by the central office 118 and stored in the example reference database 122. The example adjusted reference database 126 also includes the generated adjusted reference signatures created by the example media exposure creditor 124. The reference signatures stored in the adjusted reference database 126 correspond to reference signatures of media assets and corresponding adjusted reference signatures that are not the original presentation rate. For example, the adjusted reference signatures stored in the adjusted reference database 126 correspond to the media assets that were sped up, slowed down, etc. In some examples, the adjusted reference database 126 can include a library (e.g., database, table, etc.) of reference signatures and adjusted reference signatures.

Figure 2:
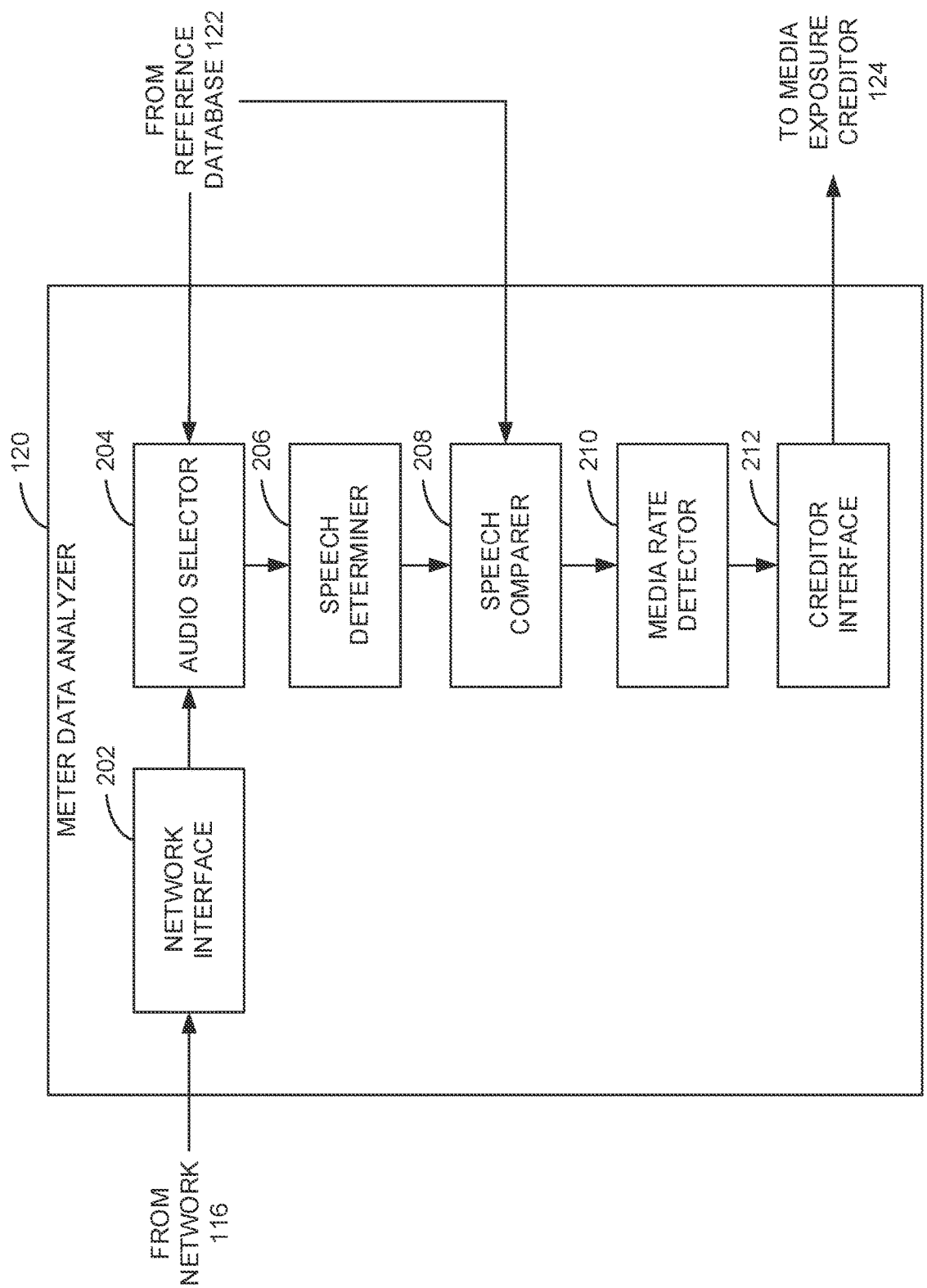
FIG. 2 is a block diagram of a meter data analyzer included in the example environment of FIG. 1.

FIG. 2 is a block diagram of a meter data analyzer 120 included in the example environment of FIG. 1. The example meter data analyzer 120 of FIG. 2 includes an example network interface 202, an example audio selector 204, an example speech determiner 206, an example speech comparer 208, an example media rate detector 210, and an example creditor interface 212.

The example network interface 202 collects monitoring data (e.g., audio data) from the example media meter 104 via the example network 116 of FIG. 1. In some examples, the network interface 202 can convert the monitoring data into a format readable by the meter data analyzer 120. In some examples, the network interface 202 can be in continuous communication with the network 116 and/or the media meter 104. In some examples, the network interface 202 can be in intermittent (e.g., periodic or aperiodic) communication with the network 116 and/or the media meter 104. In some examples, the network interface 202 can be absent. In such examples, the media meter 104 can be in direct communication with the meter data analyzer 120. For example, if the example meter data analyzer 120 is implemented via a cloud service, the media meter 104 can upload the monitoring data directly to the cloud service. In some examples, the network interface 202 obtains monitored media signature streams, monitored audio data, and associated timestamps from the monitoring data.

The example audio selector 204 obtains the monitored audio data included in the monitoring data from the example media meter 104. In some examples, the audio selector 204 implements means for selecting audio clips. The example audio selector 204 selects an audio clip from the monitored audio data collected by the example media meter 104. In examples disclosed herein, an audio clip is a segment of the audio data (e.g., the audio data that occurs in a segment of time such as, 30 seconds, one minute, five minutes, etc.). In some examples, the audio selector 204 selects each of the audio clips included in the monitored audio data with an offset. For example, the audio selector 204 may select a next audio clip from the monitored audio data with a 15 second offset from the previously selected audio clip. In some examples, the example audio selector 204 also obtains the reference audio data from the example reference database 122 of FIG. 1. In some examples, the example audio selector 204 determines reference audio clips from the reference audio data, where the reference audio clips are a similar segment size (e.g., same length of time) to the selected audio clip.

The example speech determiner 206 performs speech recognition on the selected audio clip from the monitored audio data and/or on the reference audio data from the example reference database 122. In some examples, speech determiner 206 implements means for performing speech recognition. The example speech determiner 206 uses speech recognition techniques (e.g., via neural networks and/or other algorithms) to generated text strings from the audio data. The example speech determiner 206 uses the speech recognition techniques to generate monitored text strings from the monitored audio data collected by the example media meter 104. In some examples, the speech determiner 206 performs speech recognition on the selected audio clip from the monitored audio data to recognize the monitored text string associated with the selected audio clip. In some examples, the speech determiner 206 uses the speech recognition techniques on the reference audio clips from the reference audio data stored in the example reference database 122 to generate reference text strings associated with the reference audio clips. In some examples, the example reference database 122 already includes reference text strings and/or closed caption text associated with the reference audio data (e.g., such as when reference text strings and/or closed caption text are determined for reference audio data/clips and that reference audio data/clips are initially stored in the reference database 122), and the example speech determiner 206 does not need to perform speech recognition on the reference audio clips.

The example speech comparer 208 queries the reference audio clips from the reference audio data stored in the example reference database 122. In some examples, speech comparer 208 implements means for comparing speech. In some examples, the speech comparer 208 receives the reference audio clips and associated reference text strings from the example speech determiner 206. In some examples, the speech comparer 208 obtains the reference audio data (the reference audio clips and associated reference text strings) directly from the example reference database 122. The example speech comparer 208 receives the selected audio clip from the monitored audio data and the associated monitored text string from the example speech determiner 206. The example speech comparer 208 compares the monitored text string of the selected audio clip and the reference text strings of the reference audio clips. In some examples, the speech comparer 208 compares the monitored text string to a plurality of reference text strings associated with the corresponding plurality of reference audio clips to identify matching ones of the reference text strings.

In some examples, the example speech comparer 208 determines match scores associated with the reference text strings. In some examples, the match scores are based on the comparisons of the monitored text string to the corresponding ones of the reference text strings. For example, the match score can be the number of matching characters, words, etc. between the monitored text string and the reference text string out of the total number of characters, words, etc. in the monitored text string. In some examples, the match scores represent the strengths of the matches between the monitored text string and the corresponding ones of the reference text strings. In some examples, the match scores can be a numerical value in a range. For example, the match scores can range in values from 0 to 1, 0 to 50, 0 to 100, etc. where the match score between the monitored text string and a corresponding one of the reference text strings can be any numerical value falling in the range (e.g., 0.8, 47.2, 99.7, etc.). In some examples, the larger the match score (e.g., closer to the top limit of the range) corresponds to the stronger to the match between the monitored text string and the corresponding reference text string.

In some examples, the speech comparer 208 obtains the reference audio clips and associated closed caption text from the example reference database 122. In such examples, the example speech comparer 208 queries the closed caption text from the reference audio data. The example speech comparer 208 compares the monitored text string of the selected audio clip and the closed caption text of the reference audio clips. In some examples, the speech comparer 208 compares the monitored text string to a plurality of closed caption text associated with the corresponding plurality of reference audio clips to identify matching ones of the closed caption text. In such examples, the example speech comparer 208 determines match scores associated with the closed caption text of the reference audio clips based on the comparisons of the monitored text string to the closed caption text.

The example media rate detector 210 determines the presentation rate of media monitored by the example media meter 104 based on the comparisons of the monitored text string and the reference text strings and/or the comparisons of the monitored text string and the closed caption text of the reference audio data. In some examples, media rate detector 210 implements means for estimating a presentation rate. The example media rate detector 210 estimates a presentation rate of the selected audio clip based on a time associated with the selected audio clip from the monitored audio data and a time associated with a reference audio clip corresponding to a matched reference text string. In some examples, the example media rate detector 210 uses the match scores to identify the reference audio clip with the strongest match (e.g., the highest match score). In some examples, the example media rate detector 210 selects the reference audio clip associated with the match that has the highest match score. In some examples, the media rate detector 210 identifies the timestamp associated with the selected audio clip from the monitored audio data and the timestamp associated with the matched reference audio clip. The example media rate detector 210 estimates the presentation rate for the selected audio clip from the monitored audio data based on a ratio of the time associated with the timestamp for the selected audio clip and the time associated with the timestamp of the matched reference audio clip. For example, the media rate detector 210 can determine that the selected audio clip happens at minute 42.75 in the monitored audio data and that the matched reference audio clip happens at minute 44.25 in the reference media asset. In this example, the media rate detector 210 estimates the presentation rate as being the ratio of 42.75 and 44.25, which results in a presentation rate of about 1.035.

In some examples, the speech comparer 208 identifies a plurality of reference audio clips that are associated with reference text strings that are determined to match the monitored text strings associated with the plurality of audio clips from the monitored audio data. In some examples, the media rate detector 210 estimates presentation rates for the plurality of audio clips from the monitored audio data (e.g., the plurality of 30 second audio clips from the monitored audio data). In some examples, the example media rate detector 210 estimates a plurality of presentation rates for the sequence of audio clips included in the monitored audio data based on the plurality of times associated with the audio clips and the plurality of times associated with each of the identified matching reference audio clips. In some examples, the example media rate detector 210 averages the plurality of presentation rates to determine a resultant presentation rate for the monitored audio data.

The example creditor interface 212 outputs the resultant presentation rate determined by the example media rate detector 210 for crediting the media exposure of the monitored audio data collected by the example media meter 104. In some examples, creditor interface 212 implements means for outputting a presentation rate. In some examples, the creditor interface 212 outputs the resultant presentation rate for the monitored audio data for adjusting a signature generation procedure based on the resultant presentation rate to credit the exposure of the selected audio clip to a media asset associated with the reference audio clip(s) that matched the selected audio clip. In some examples, the creditor interface 212 transmits the resultant presentation rate, the monitoring data (e.g., the monitored media signature streams, monitored audio data, and associated timestamps) collected by the example media meter 104, and identification information for the matching reference audio clip(s) to the media exposure creditor 124 of FIG. 1.

In some examples, at least part of the meter data analyzer 120 can be implemented in the example media meter 104 of FIG. 1 instead of the central office 118. For example, the speech recognition processing performed by the example speech determiner 206 can occur in the media meter 104 to reduce the amount of data reported to the central office 118. In such an example, the media meter 104 would report the monitored text strings without the entire monitored audio data that was collected, which would reduce the amount of data reported to the central office 118.

FIG. 3 illustrates example speed-up data 300 of a media asset at a presentation rate compared to queried media assets. For example, the meter data analyzer 120 of FIGS. 1 and/or 2 generates the speed-up data 300 based on monitored media of the environment 100 of FIG. 1. For example, the speed-up data 300 corresponds to the television show "The Crown." The speed-up data 300 includes example media time data 302, example reference time data 304, example match scores 306, and example presentation rates 308. In the illustrated example, each of the media time data 302, example reference time data 304, example match scores 306, and example presentation rates 308 are associated with different pairs of audio clips (e.g., the selected audio clips from the monitored media data and the matching reference audio clips from the reference database 122 (FIG. 1)). In the illustrated example, the example media time data 302 represents the time (e.g., timestamp) associated with the selected audio clip from the monitored audio data. In the illustrated example, the example reference time data 304 represents the time (e.g., timestamp) associated with the reference audio clip corresponding to the reference text string or reference closed caption text that was queried and determined to match the selected audio clip from the monitored audio data.

In the illustrated example of FIG. 3, the example match scores 306 illustrate the match scores associated with the reference text strings or reference closed caption text from the query determined by the example speech comparer 208 (FIG. 2). The example match scores 306 are based on the comparison of the monitored text string associated with the example media time data 302 and the reference text string or reference closed caption text associated with the example reference time data 304. In some examples, the match scores 306 represent the strengths of the matches between the monitored text string associated with the example media time data 302 and the reference text string or reference closed caption text associated with the example reference time data 304. In the illustrated example, the match scores 306 range from 0 to 100, but other ranges and numerical values can be used (e.g., 0 to 1, 0 to 50, etc.). In some examples, the larger the match score (e.g., closer to the top limit of the range) corresponds to the stronger the match between the monitored text string and the corresponding reference text string/reference closed caption text.

In the illustrated example, the example presentation rates 308 represent the presentation rates determined by the example media rate detector 210 based on the time associated with the selected audio clip (the example media time data 302) from the monitored audio data and a time associated with a reference audio clip (the example reference time data 304) corresponding to a matched reference text string. In the illustrated example of FIG. 3, the example media rate detector 210 determines the presentation rates 308 by taking the ratio of the example reference time data 304 over the example media time data 302. For example, in the first line of the example speed-up data 300, the example presentation rate 308 is found to be 1.03509, which is a results of the example reference time data 304 over the example media time data 302 (44.25/42.75).

While an example manner of implementing the meter data analyzer 120 of FIG. 1 is illustrated in FIG. 2, one or more of the elements, processes and/or devices illustrated in FIG. 2 may be combined, divided, re-arranged, omitted, eliminated and/or implemented in any other way. Further, the example network interface 202, the example audio selector 204, the example speech determiner 206, the example speech comparer 208, the example media rate detector 210, the example creditor interface 212 and/or, more generally, the example meter data analyzer 120 of FIGS. 1 and/or 1 may be implemented by hardware, software, firmware and/or any combination of hardware, software and/or firmware. Thus, for example, any of the example network interface 202, the example audio selector 204, the example speech determiner 206, the example speech comparer 208, the example media rate detector 210, the example creditor interface 212 and/or, more generally, the example meter data analyzer 120 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network interface 202, the example audio selector 204, the example speech determiner 206, the example speech comparer 208, the example media rate detector 210, and/or the example creditor interface 212 is/are hereby expressly defined to include a non-transitory computer readable storage device or storage disk such as a memory, a digital versatile disk (DVD), a compact disk (CD), a Blu-ray disk, etc. including the software and/or firmware. Further still, the example meter data analyzer 120 of FIGS. 1 and/or 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
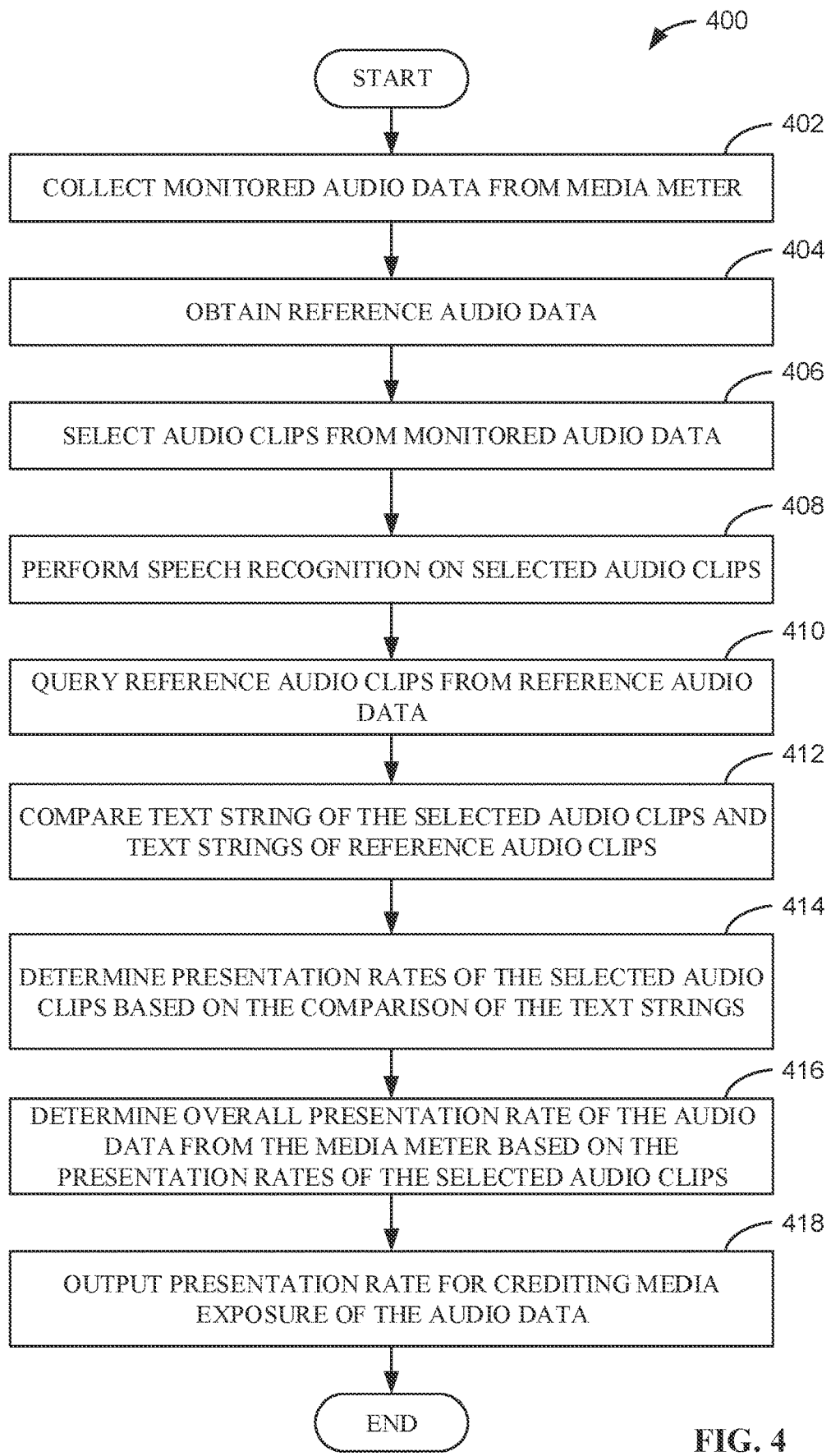
FIG. 4 is a flowchart representative of machine readable instructions which may be executed to implement the meter data analyzer of FIGS. 1 and/or 2 to determine a presentation rate using audio clips data.
Figure 5:
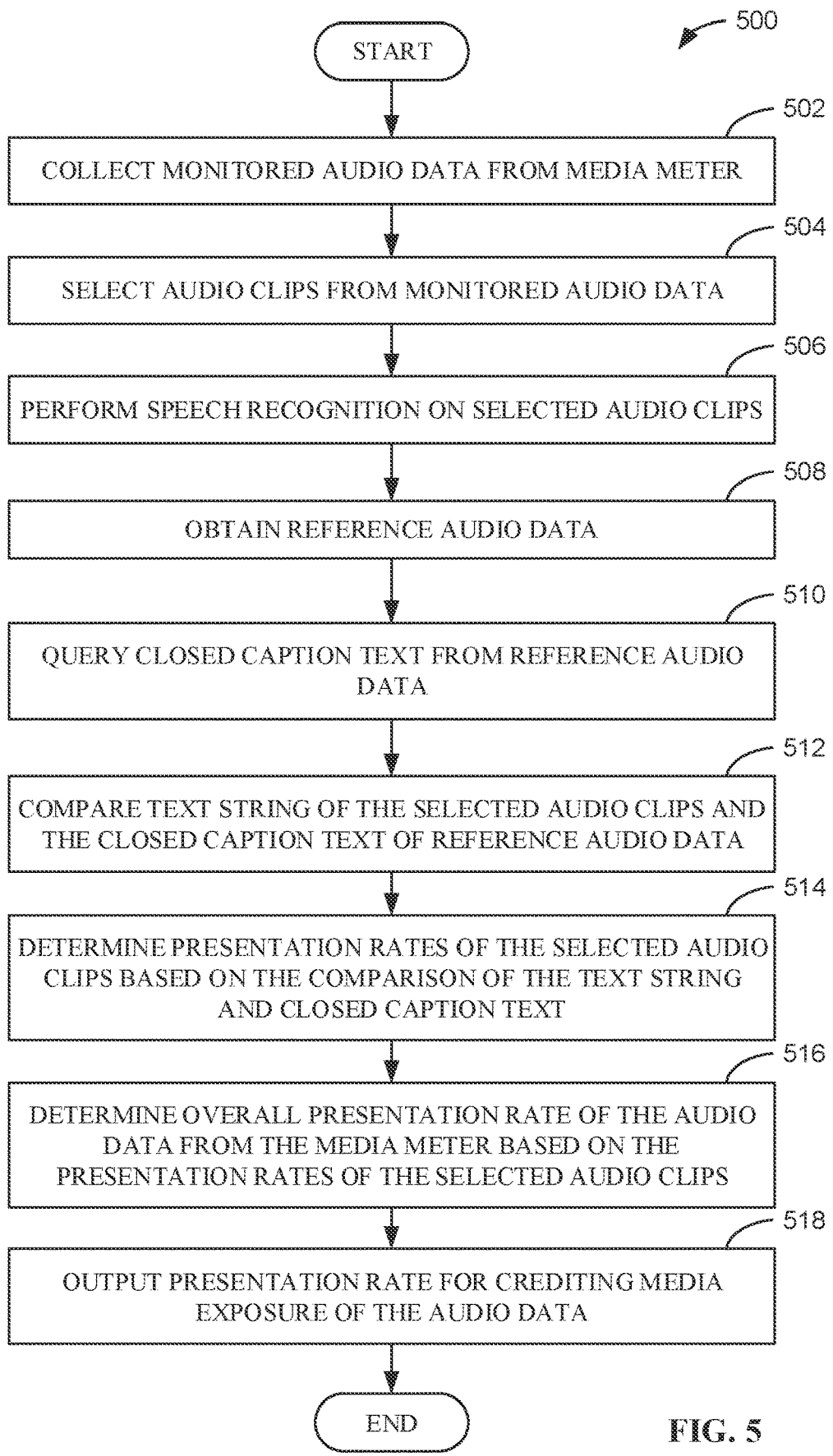
FIG. 5 is a flowchart representative of machine readable instructions which may be executed to implement the meter data analyzer of FIGS. 1 and/or 2 to determine a presentation rate using audio text data.

A flowchart representative of example hardware logic, machine readable instructions, hardware implemented state machines, and/or any combination thereof for implementing the meter data analyzer 120 of FIGS. 1 and/or 2 is shown in FIGS. 4 and 5. The machine readable instructions may be one or more executable programs or portion(s) of an executable program for execution by a computer processor and/or processor circuitry, such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIGS. 4 and 5, many other methods of implementing the example meter data analyzer 120 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 4 and 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 4 is a flowchart representative of machine readable instructions 400 which may be executed to implement the meter data analyzer 120 of FIGS. 1 and/or 2 to determine a presentation rate using audio clips data. The machine readable instructions 400 begin at block 402 at which the example network interface 202 collects monitored audio data from the media meter 104 (FIG. 1). The example network interface 202 collects monitoring data (e.g., audio data) from the example media meter 104 via the example network 116 of FIG. 1. In some examples, the network interface 202 can convert the monitoring data into a format readable by the meter data analyzer 120. In some examples, the network interface 202 can be in continuous communication with the network 116 and/or the media meter 104. In some examples, the network interface 202 can be in intermittent (e.g., periodic or aperiodic) communication with the network 116 and/or the media meter 104. In some examples, the network interface 202 obtains monitored media signature streams, monitored audio data, and associated timestamps from the monitoring data.

At block 404, the example audio selector 204 obtains reference audio data. In some examples, the example audio selector 204 also obtains the reference audio data from the example reference database 122 of FIG. 1. At block 406, the example audio selector 204 selects audio clips from the monitored audio data. The example audio selector 204 obtains the monitored audio data included in the monitoring data from the example media meter 104. The example audio selector 204 selects audio clips from the monitored audio data collected by the example media meter 104. In examples disclosed herein, an audio clip is a segment of the audio data (e.g., an audio clip can correspond to the audio data that occurs in a segment of time such as, 30 seconds, one minute, five minutes, etc.). In some examples, the audio selector 204 selects each of the audio clips included in the monitored audio data with an offset. For example, the audio selector 204 may select a next audio clip from the monitored audio data with a 15 second offset from the previously selected audio clip. In some examples, the example audio selector 204 determines reference audio clips from the reference audio data, where the reference audio clips are a similar segment size (e.g., same length of time) to the selected audio clip.

At block 408, the example speech determiner 206 performs speech recognition on the selected audio clips. The example speech determiner 206 performs speech recognition on the selected audio clips from the monitored audio data and/or on the reference audio data from the example reference database 122. The example speech determiner 206 uses speech recognition techniques (e.g., via neural networks or other algorithms) to generated text strings from the audio data. The example speech determiner 206 uses the speech recognition techniques to generate monitored text strings from the monitored audio data collected by the example media meter 104. In some examples, the speech determiner 206 performs speech recognition on the selected audio clips from the monitored audio data to recognize the monitored text strings associated with the selected audio clips. In some examples, the speech determiner 206 uses the speech recognition techniques on the reference audio clips from the reference audio data stored in the example reference database 122 to generate reference text strings associated with the reference audio clips. In some examples, the example reference database 122 includes reference text strings associated with the reference audio data, and the example speech determiner 206 does not need to perform speech recognition on the reference audio clips.

At block 410, the example speech comparer 208 queries the reference audio clips from the reference audio data. The example speech comparer 208 queries the reference audio clips from the reference audio data stored in the example reference database 122. In some examples, the speech comparer 208 receives the reference audio clips and associated reference text strings from the example speech determiner 206. In other examples, the speech comparer 208 obtains the reference audio data (the reference audio clips and associated reference text strings) directly from the example reference database 122. In some examples, the speech comparer 208 queries the reference audio clips using the monitored text strings from the selected audio clips. For example, the speech comparer 208 queries the reference audio clips for the reference audio clips that include data matching the monitored text strings.

At block 412, the example speech comparer 208 compares the text strings of the selected audio clips and the text strings of the reference audio clips. In some examples, the example speech comparer 208 receives the selected audio clips from the monitored audio data and the associated monitored text strings from the example speech determiner 206. The example speech comparer 208 compares the monitored text strings of the selected audio clips and the reference text strings of the reference audio clips. In some examples, the speech comparer 208 compares the monitored text strings to a plurality of reference text strings associated with the corresponding plurality of reference audio clips to identify matching ones of the reference text strings.

At block 414, the example media rate detector 210 determines the presentation rates of the selected audio clips based on the comparison of the text strings. The example media rate detector 210 determines the presentation rate of the audio data from the monitored media collected by the example media meter 104 based on the comparisons of the monitored text strings and the reference text strings. The example media rate detector 210 estimates a presentation rate of each of the selected audio clips based on a time associated with each of the selected audio clips from the monitored audio data and a time associated with a reference audio clip corresponding to a matched reference text string. In some examples, the example media rate detector 210 uses the match scores to identify the reference audio clip with the strongest match (e.g., the highest match score). In some examples, the example media rate detector 210 selects the reference audio clip associated with the match that has the highest match score. In some examples, the media rate detector 210 identifies the timestamps associated with the selected audio clips from the monitored audio data and the timestamp associated with the corresponding matched reference audio clips. The example media rate detector 210 estimates the presentation rates for the selected audio clips from the monitored audio data based on ratios of the times associated with the timestamps for each of the selected audio clips and the times associated with the timestamps of the corresponding matched reference audio clips.

At block 416, the example media rate detector 210 determines the overall presentation rate of the audio data from the media meter 104 of FIG. 1 based on the presentation rates of the selected audio clips. In some examples, the media rate detector 210 estimates a plurality of individual presentation rates for each of the plurality of audio clips from the monitored audio data (e.g., the plurality of 30 second audio clips from the monitored audio data). In some examples, the example media rate detector 210 averages the plurality of individual presentation rates determined for the selected audio clips to determine a resultant presentation rate for the monitored audio data.

At block 418, the example creditor interface 212 outputs the presentation rate for crediting the media exposure of the audio data. The example creditor interface 212 outputs the resultant presentation rate determined by the example media rate detector 210 for crediting the media exposure of the monitored audio data collected by the example media meter 104. In some examples, the creditor interface 212 outputs the resultant presentation rate for the monitored audio data for adjusting a signature generation procedure based on the resultant presentation rate to credit the exposure of the selected audio clips to a reference media asset associated with the reference audio clip(s) that matched the selected audio clips. In some examples, the creditor interface 212 transmits the resultant presentation rate, the monitoring data (e.g., the monitored media signature streams, monitored audio data, and associated timestamps) collected by the example media meter 104, and identification information for the matching reference audio clip(s) to the media exposure creditor 124 of FIG. 1. After block 418 completes, program 400 ends.

FIG. 5 is a flowchart representative of machine readable instructions 500 which may be executed to implement the meter data analyzer 120 of FIGS. 1 and/or 2 to determine a presentation rate using audio text data. The machine readable instructions 500 begin at block 502 at which the example network interface 202 collects monitored audio data from the media meter 104 (FIG. 1). The example network interface 202 collects monitoring data (e.g., audio data) from the example media meter 104 via the example network 116 of FIG. 1. In some examples, the network interface 202 can convert the monitoring data into a format readable by the meter data analyzer 120. In some examples, the network interface 202 can be in continuous communication with the network 116 and/or the media meter 104. In some examples, the network interface 202 can be in intermittent (e.g., periodic or aperiodic) communication with the network 116 and/or the media meter 104. In some examples, the network interface 202 obtains monitored media signature streams, monitored audio data, and associated timestamps from the monitoring data.

At block 504, the example audio selector 204 selects audio clips from the monitored audio data collected by the example media meter 104. In examples disclosed herein, an audio clip is a segment of the audio data (e.g., an audio clip can correspond to the audio data that occurs in a segment of time such as, 30 seconds, one minute, five minutes, etc.). In some examples, the audio selector 204 selects each of the audio clips included in the monitored audio data with an offset. For example, the audio selector 204 may select a next audio clip from the monitored audio data with a 15 second offset from the previously selected audio clip. In some examples, the example audio selector 204 determines reference audio clips from the reference audio data, where the reference audio clips are a similar segment size (e.g., same length of time) to the selected audio clip.

At block 506, the example speech determiner 206 performs speech recognition on the selected audio clips. The example speech determiner 206 performs speech recognition on the selected audio clips from the monitored audio data and/or on the reference audio data from the example reference database 122. The example speech determiner 206 uses speech recognition techniques (e.g., via neural networks or other algorithms) to generate text strings from the audio data. The example speech determiner 206 uses the speech recognition techniques to generate monitored text strings from the monitored audio data collected by the example media meter 104. In some examples, the speech determiner 206 performs speech recognition on the selected audio clips from the monitored audio data to recognize the monitored text strings associated with the selected audio clips. In some examples, the example reference database 122 includes closed caption text associated with the reference audio data, and the example speech determiner 206 does not need to perform speech recognition on the reference audio clips.

At block 508, the example speech comparer 208 obtains reference audio data. In some examples, the speech comparer 208 obtains the reference audio data (the reference audio clips and associated closed caption text) directly from the example reference database 122. At block 510, the example speech comparer 208 queries the closed caption text from the reference audio data. In some examples, the example speech comparer 208 queries the closed caption text from the reference audio data stored in the example reference database 122. In some examples, the speech comparer 208 queries the closed caption text using the monitored text strings from the selected audio clips. For example, the speech comparer 208 queries the closed caption text for the closed caption text that include data matching the monitored text strings.

At block 512, the example speech comparer 208 compares the text strings of the selected audio clips and the closed caption text of the reference audio clips. In some examples, the speech comparer 208 compares the monitored text strings to a plurality of closed caption text associated with the corresponding plurality of reference audio clips to identify matching ones of the closed caption text.

At block 514, the example media rate detector 210 determines the presentation rates of the selected audio clips based on the comparison of the text string and the closed caption text. The example media rate detector 210 determines the presentation rate of the audio data from the monitored media collected by the example media meter 104 based on the comparisons of the monitored text string and the closed caption text of the reference audio data. The example media rate detector 210 estimates a presentation rate of each of the selected audio clips based on a time associated with each of the selected audio clips from the monitored audio data and a time associated with a reference audio clip corresponding to matched closed caption text. In some examples, the example media rate detector 210 uses the match scores to identify the reference audio clip with the strongest match (e.g., the highest match score). In some examples, the example media rate detector 210 selects the reference audio clip associated with the match that has the highest match score. In some examples, the media rate detector 210 identifies the timestamps associated with the selected audio clips from the monitored audio data and the timestamps associated with the corresponding matched reference audio clips. The example media rate detector 210 estimates the presentation rates for the selected audio clips from the monitored audio data based on ratios of the times associated with the timestamps for each of the selected audio clips and the times associated with the timestamps of the corresponding matched reference audio clips.

At block 516, the example media rate detector 210 determines the overall presentation rate of the audio data from the media meter 104 of FIG. 1 based on the presentation rates of the selected audio clips. In some examples, the media rate detector 210 estimates a plurality of individual presentation rates for each of the plurality of audio clips from the monitored audio data (e.g., the plurality of 30 second audio clips from the monitored audio data). In some examples, the example media rate detector 210 averages the plurality of individual presentation rates determined for the selected audio clips to determine a resultant presentation rate for the monitored audio data.

At block 518, the example creditor interface 212 outputs the presentation rate for crediting the media exposure of the audio data. The example creditor interface 212 outputs the resultant presentation rate determined by the example media rate detector 210 for crediting the media exposure of the monitored audio data collected by the example media meter 104. In some examples, the creditor interface 212 outputs the resultant presentation rate for selected audio clip from the monitored audio data for adjusting a signature generation procedure based on the resultant presentation rate to credit the exposure of the selected audio clip to a media asset associated with the reference audio clip(s) that matched the selected audio clip. In some examples, the creditor interface 212 transmits the resultant presentation rate, the monitoring data (e.g., the monitored media signature streams, monitored audio data, and associated timestamps) collected by the example media meter 104, and identification information for the matching reference audio clip(s) to the media exposure creditor 124 of FIG. 1. After block 518 completes, program 500 ends.

Figure 6:
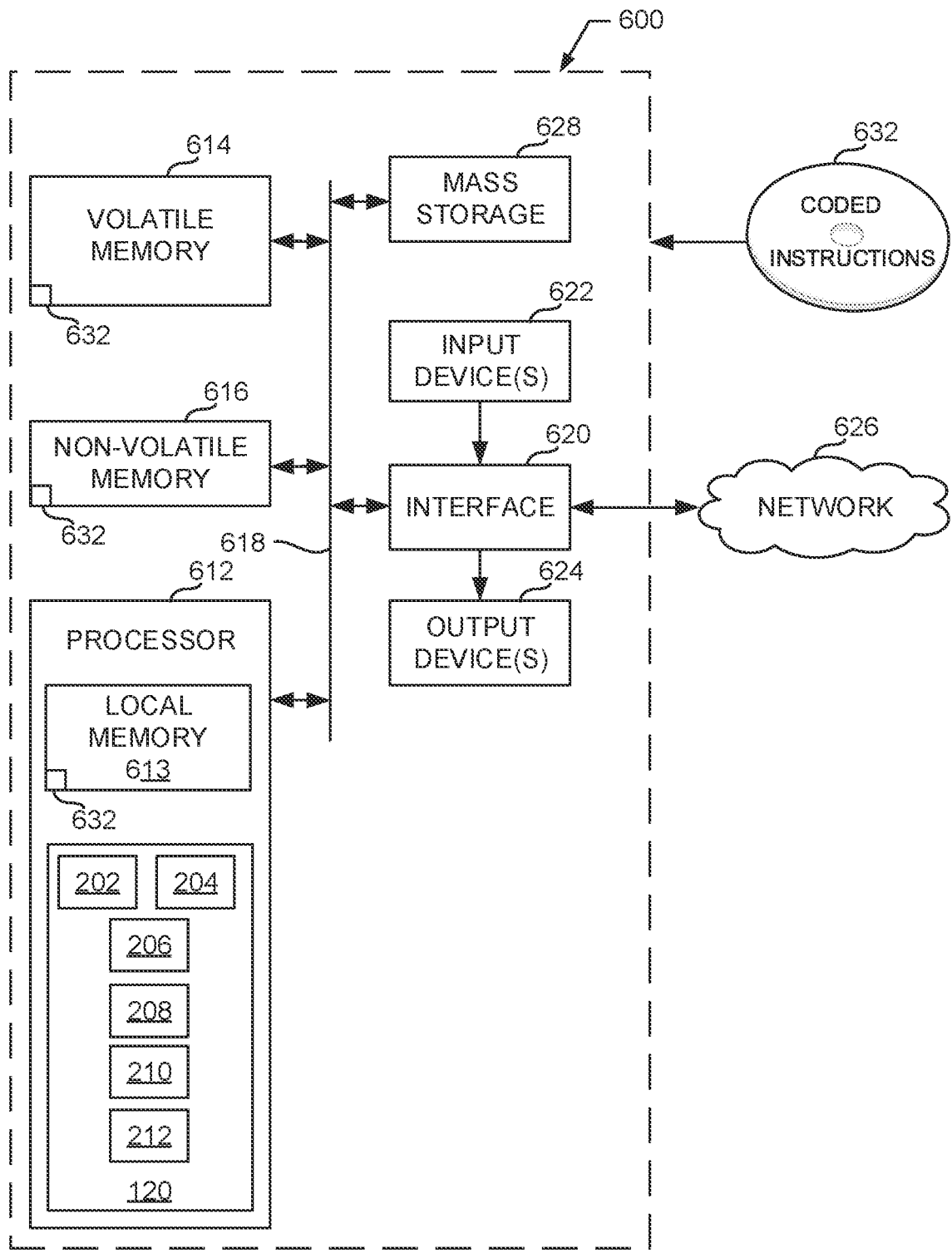
FIG. 6 is a block diagram of an example processing platform structured to execute the instructions of FIGS. 4 and/or 5 to implement the meter data analyzer of FIGS. 1 and/or 2.

FIG. 6 is a block diagram of an example processor platform 600 structured to execute the instructions of FIGS. 4 and 5 to implement the example meter data analyzer 120 of FIGS. 1 and/or 2. The processor platform 600 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example network interface 202, the example audio selector 204, the example speech determiner 206, the example speech comparer 208, the example media rate detector 210, and the example creditor interface 212.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIGS. 4 and 5 may be stored in the mass storage device 628, in the volatile memory 614, in the non-volatile memory 616, and/or on a removable non-transitory computer readable storage medium such as a CD or DVD.

Figure 7:
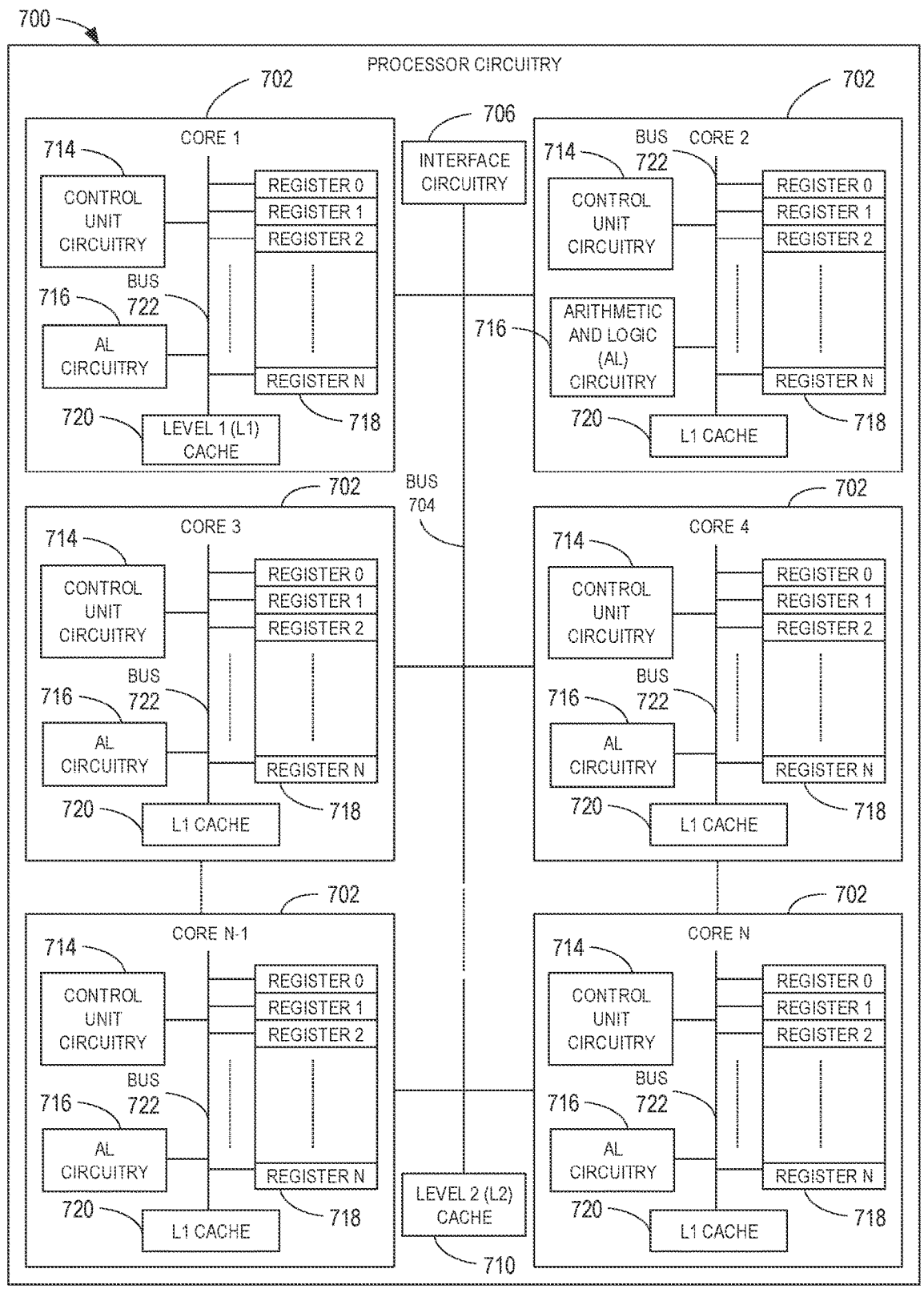
FIG. 7 is a block diagram of an example implementation of the processor circuitry of FIG. 6.

FIG. 7 is a block diagram of an example implementation of the processor circuitry 612 of FIG. 6. In this example, the processor circuitry 612 of FIG. 6 is implemented by a microprocessor 700. For example, the microprocessor 700 may implement multi-core hardware circuitry such as a CPU, a DSP, a GPU, an XPU, etc. Although it may include any number of example cores 702 (e.g., 1 core), the microprocessor 700 of this example is a multi-core semiconductor device including N cores. The cores 702 of the microprocessor 700 may operate independently or may cooperate to execute machine readable instructions. For example, machine code corresponding to a firmware program, an embedded software program, or a software program may be executed by one of the cores 702 or may be executed by multiple ones of the cores 702 at the same or different times. In some examples, the machine code corresponding to the firmware program, the embedded software program, or the software program is split into threads and executed in parallel by two or more of the cores 702. The software program may correspond to a portion or all of the machine readable instructions and/or operations represented by the flowcharts of FIGS. 4 and 5.

The cores 702 may communicate by an example bus 704. In some examples, the bus 704 may implement a communication bus to effectuate communication associated with one(s) of the cores 702. For example, the bus 704 may implement at least one of an Inter-Integrated Circuit (I2C) bus, a Serial Peripheral Interface (SPI) bus, a PCI bus, or a PCIe bus. Additionally or alternatively, the bus 704 may implement any other type of computing or electrical bus. The cores 702 may obtain data, instructions, and/or signals from one or more external devices by example interface circuitry 706. The cores 702 may output data, instructions, and/or signals to the one or more external devices by the interface circuitry 706. Although the cores 702 of this example include example local memory 720 (e.g., Level 1 (L1) cache that may be split into an L1 data cache and an L1 instruction cache), the microprocessor 700 also includes example shared memory 710 that may be shared by the cores (e.g., Level 2 (L2_cache)) for high-speed access to data and/or instructions. Data and/or instructions may be transferred (e.g., shared) by writing to and/or reading from the shared memory 710. The local memory 720 of each of the cores 702 and the shared memory 710 may be part of a hierarchy of storage devices including multiple levels of cache memory and the main memory (e.g., the main memory 614, 616 of FIG. 6). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 702 may be referred to as a CPU, DSP, GPU, etc., or any other type of hardware circuitry. Each core 702 includes control unit circuitry 714, arithmetic and logic (AL) circuitry (sometimes referred to as an ALU) 716, a plurality of registers 718, the L1 cache 720, and an example bus 722. Other structures may be present. For example, each core 702 may include vector unit circuitry, single instruction multiple data (SIMD) unit circuitry, load/store unit (LSU) circuitry, branch/jump unit circuitry, floating-point unit (FPU) circuitry, etc. The control unit circuitry 714 includes semiconductor-based circuits structured to control (e.g., coordinate) data movement within the corresponding core 702. The AL circuitry 716 includes semiconductor-based circuits structured to perform one or more mathematic and/or logic operations on the data within the corresponding core 702. The AL circuitry 716 of some examples performs integer based operations. In other examples, the AL circuitry 716 also performs floating point operations. In yet other examples, the AL circuitry 716 may include first AL circuitry that performs integer based operations and second AL circuitry that performs floating point operations. In some examples, the AL circuitry 716 may be referred to as an Arithmetic Logic Unit (ALU). The registers 718 are semiconductor-based structures to store data and/or instructions such as results of one or more of the operations performed by the AL circuitry 716 of the corresponding core 702. For example, the registers 718 may include vector register(s), SIMD register(s), general purpose register(s), flag register(s), segment register(s), machine specific register(s), instruction pointer register(s), control register(s), debug register(s), memory management register(s), machine check register(s), etc. The registers 718 may be arranged in a bank as shown in FIG. 7. Alternatively, the registers 718 may be organized in any other arrangement, format, or structure including distributed throughout the core 702 to shorten access time. The bus 720 may implement at least one of an I2C bus, a SPI bus, a PCI bus, or a PCIe bus Each core 702 and/or, more generally, the microprocessor 700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 700 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 8:
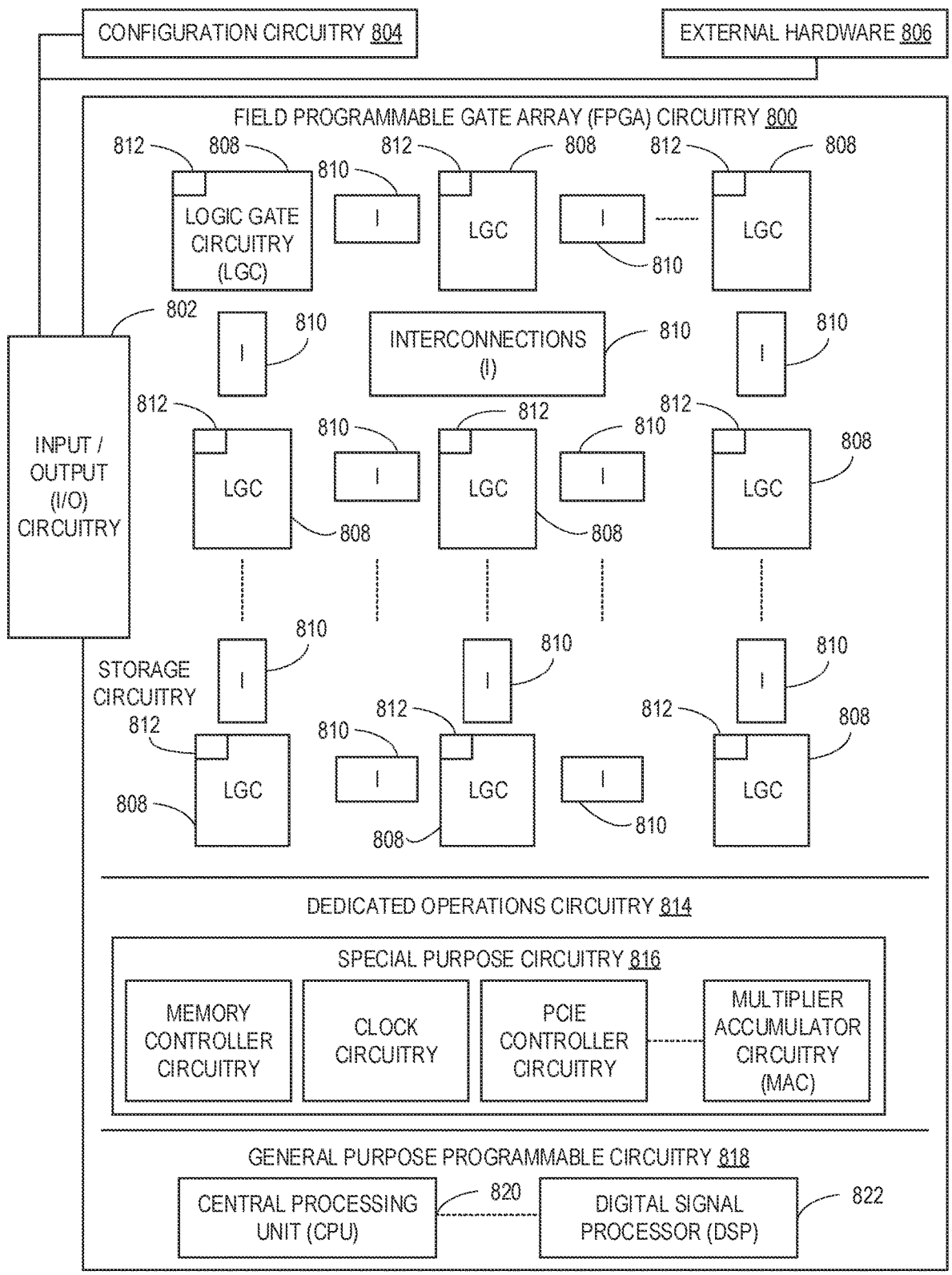
FIG. 8 is a block diagram of another example implementation of the processor circuitry of FIG. 6.

FIG. 8 is a block diagram of another example implementation of the processor circuitry 612 of FIG. 6. In this example, the processor circuitry 612 is implemented by FPGA circuitry 800. The FPGA circuitry 800 can be used, for example, to perform operations that could otherwise be performed by the example microprocessor 700 of FIG. 7 executing corresponding machine readable instructions. However, once configured, the FPGA circuitry 800 instantiates the machine readable instructions in hardware and, thus, can often execute the operations faster than they could be performed by a general purpose microprocessor executing the corresponding software.

More specifically, in contrast to the microprocessor 700 of FIG. 7 described above (which is a general purpose device that may be programmed to execute some or all of the machine readable instructions represented by the flowcharts of FIGS. 4 and 5 but whose interconnections and logic circuitry are fixed once fabricated), the FPGA circuitry 800 of the example of FIG. 8 includes interconnections and logic circuitry that may be configured and/or interconnected in different ways after fabrication to instantiate, for example, some or all of the machine readable instructions represented by the flowcharts of FIGS. 4 and 5. In particular, the FPGA 800 may be thought of as an array of logic gates, interconnections, and switches. The switches can be programmed to change how the logic gates are interconnected by the interconnections, effectively forming one or more dedicated logic circuits (unless and until the FPGA circuitry 800 is reprogrammed). The configured logic circuits enable the logic gates to cooperate in different ways to perform different operations on data received by input circuitry. Those operations may correspond to some or all of the software represented by the flowcharts of FIGS. 4 and 5. As such, the FPGA circuitry 800 may be structured to effectively instantiate some or all of the machine readable instructions of the flowcharts of FIGS. 4 and 5 as dedicated logic circuits to perform the operations corresponding to those software instructions in a dedicated manner analogous to an ASIC. Therefore, the FPGA circuitry 800 may perform the operations corresponding to the some or all of the machine readable instructions of FIGS. 4 and 5 faster than the general purpose microprocessor can execute the same.

In the example of FIG. 8, the FPGA circuitry 800 is structured to be programmed (and/or reprogrammed one or more times) by an end user by a hardware description language (HDL) such as Verilog. The FPGA circuitry 800 of FIG. 8, includes example input/output (I/O) circuitry 802 to obtain and/or output data to/from example configuration circuitry 804 and/or external hardware (e.g., external hardware circuitry) 806. For example, the configuration circuitry 804 may implement interface circuitry that may obtain machine readable instructions to configure the FPGA circuitry 800, or portion(s) thereof. In some such examples, the configuration circuitry 804 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 806 may implement the microprocessor 700 of FIG. 7. The FPGA circuitry 800 also includes an array of example logic gate circuitry 808, a plurality of example configurable interconnections 810, and example storage circuitry 812. The logic gate circuitry 808 and interconnections 810 are configurable to instantiate one or more operations that may correspond to at least some of the machine readable instructions of FIGS. 4 and 5 and/or other desired operations. The logic gate circuitry 808 shown in FIG. 8 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 808 to enable configuration of the electrical structures and/or the logic gates to form circuits to perform desired operations. The logic gate circuitry 808 may include other electrical structures such as look-up tables (LUTs), registers (e.g., flip-flops or latches), multiplexers, etc.

The interconnections 810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 808 to program desired logic circuits.

The storage circuitry 812 of the illustrated example is structured to store result(s) of the one or more of the operations performed by corresponding logic gates. The storage circuitry 812 may be implemented by registers or the like. In the illustrated example, the storage circuitry 812 is distributed amongst the logic gate circuitry 808 to facilitate access and increase execution speed.

The example FPGA circuitry 800 of FIG. 8 also includes example Dedicated Operations Circuitry 814. In this example, the Dedicated Operations Circuitry 814 includes special purpose circuitry 816 that may be invoked to implement commonly used functions to avoid the need to program those functions in the field. Examples of such special purpose circuitry 816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 800 may also include example general purpose programmable circuitry 818 such as an example CPU 820 and/or an example DSP 822. Other general purpose programmable circuitry 818 may additionally or alternatively be present such as a GPU, an XPU, etc., that can be programmed to perform other operations.

Although FIGS. 7 and 8 illustrate two example implementations of the processor circuitry 612 of FIG. 6, many other approaches are contemplated. For example, as mentioned above, modern FPGA circuitry may include an on-board CPU, such as one or more of the example CPU 820 of FIG. 8. Therefore, the processor circuitry 612 of FIG. 6 may additionally be implemented by combining the example microprocessor 700 of FIG. 7 and the example FPGA circuitry 800 of FIG. 8. In some such hybrid examples, a first portion of the machine readable instructions represented by the flowcharts of FIGS. 4 and 5 may be executed by one or more of the cores 702 of FIG. 7 and a second portion of the machine readable instructions represented by the flowcharts of FIGS. 4 and 5 may be executed by the FPGA circuitry 800 of FIG. 8.

In some examples, the processor circuitry 612 of FIG. 6 may be in one or more packages. For example, the processor circuitry 700 of FIG. 7 and/or the FPGA circuitry 800 of FIG. 8 may be in one or more packages. In some examples, an XPU may be implemented by the processor circuitry 612 of FIG. 6, which may be in one or more packages. For example, the XPU may include a CPU in one package, a DSP in another package, a GPU in yet another package, and an FPGA in still yet another package.

Figure 9:
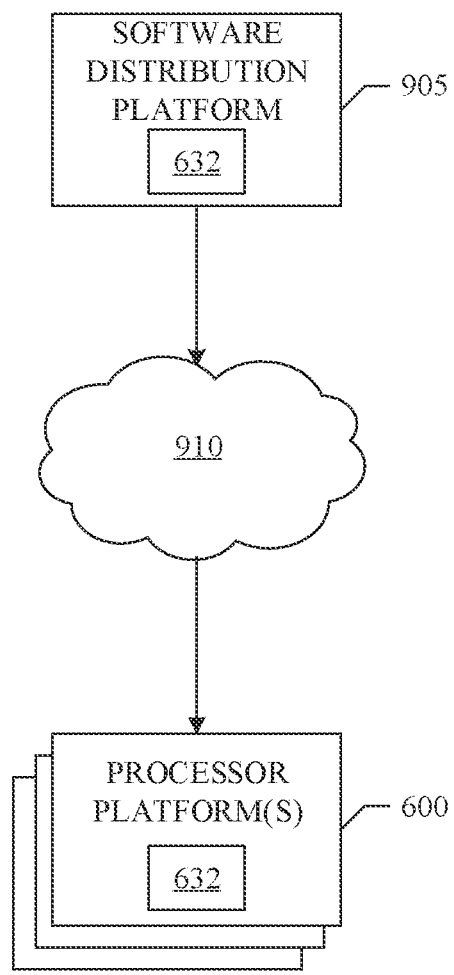
FIG. 9 is a block diagram of an example software distribution platform to distribute software (e.g., software corresponding to the example computer readable instructions of FIGS. 4 and 5) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 905 to distribute software such as the example computer readable instructions 632 of FIG. 6 to third parties is illustrated in FIG. 9. The example software distribution platform 905 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 632 of FIG. 6. The third parties may be consumers, users, retailers, OEMs, etc., who purchase and/or license the software for use and/or re-sale and/or sub-licensing. In the illustrated example, the software distribution platform 905 includes one or more servers and one or more storage devices. The storage devices store the computer readable instructions 632, which may correspond to the example computer readable instructions 400, 500 of FIGS. 4-5, as described above. The one or more servers of the example software distribution platform 905 are in communication with a network 910, which may correspond to any one or more of the Internet and/or any of the example network 626 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 632 from the software distribution platform 905. For example, the software, which may correspond to the example computer readable instructions 400, 500 of FIGS. 4-5, may be downloaded to the example processor platform 600, which is to execute the computer readable instructions 632 to implement the example meter data analyzer 120 of FIGS. 1 and/or 2. In some example, one or more servers of the software distribution platform 905 periodically offer, transmit, and/or force updates to the software (e.g., the example computer readable instructions 632 of FIG. 6) to ensure improvements, patches, updates, etc. are distributed and applied to the software at the end user devices.

From the foregoing, it will be appreciated that example methods, apparatus and articles of manufacture have been disclosed that determine the presentation rate (e.g., normal rate, speed-up, slow-down, etc.) of media programs using speech recognition. The disclosed methods, apparatus and articles of manufacture use speech recognition techniques on short audio clips of the media to identify matching phrases at the original and modified (e.g., sped-up, slow-down, etc.) presentation times. The disclosed methods, apparatus and articles of manufacture determine a numerical estimate of how much the media has been sped-up, slowed-down, etc. to assist in signature matching methods. The disclosed methods, apparatus and articles of manufacture improve the efficiency of using a computing device by reducing computational and storage requirements of systems that identify media using signatures. For example, disclosed examples prevent incorrect crediting and storage of signatures corresponding to the same media asset with different presentation rates, which enables broader, more accurate crediting of media. The disclosed methods, apparatus and articles of manufacture are accordingly directed to one or more improvement(s) in the functioning of a computer.

Example methods, apparatus, systems, and articles of manufacture to determine the speed-up of media programs using speech recognition are disclosed herein. Further examples and combinations thereof include the following:

Example 1 includes an apparatus comprising at least one memory, computer readable instructions, and at least one processor to execute the instructions to cause the at least one processor to at least perform speech recognition on a first audio clip collected by a media meter to recognize a first text string associated with the first audio clip, compare the first text string to a plurality of reference text strings associated with a corresponding plurality of reference audio clips to identify a matched one of the reference text strings, and estimate a presentation rate of the first audio clip based on a first time associated with the first audio clip and a second time associated with a first one of the reference audio clips corresponding to the matched one of the reference text strings.

Example 2 includes the apparatus of example 1, wherein the at least one processor is to select the first audio clip from audio data collected by the media meter.

Example 3 includes the apparatus of example 1, wherein the at least one processor is to determine match scores associated with corresponding ones of the reference text strings, the match scores based on comparisons of the first text string to the corresponding ones of the reference text strings.

Example 4 includes the apparatus of example 3, wherein the match scores represent strengths of the matches between the first text string and the corresponding ones of the reference text strings.

Example 5 includes the apparatus of example 1, wherein the at least one processor is to estimate the presentation rate based on a ratio of the first time and the second time.

Example 6 includes the apparatus of example 1, wherein the presentation rate is a first presentation rate, and wherein the at least one processor is to estimate a plurality of presentation rates based on a first plurality of times associated with a plurality of audio clips and a second plurality of times associated with ones of the reference audio clips with the reference text strings determined to match a plurality of text strings associated with the plurality of audio clips.

Example 7 includes the apparatus of example 6, wherein the at least one processor is to average the first presentation rate and the plurality of presentation rates to determine a resultant presentation rate.

Example 8 includes the apparatus of example 7, wherein the at least one processor is to output the resultant presentation rate for adjusting a signature generation procedure based on the resultant presentation rate to credit exposure of the first audio clip to a media asset.

Example 9 includes At least one non-transitory computer readable medium comprising computer readable instructions which, when executed, cause at least one processor to at least perform speech recognition on a first audio clip collected by a media meter to recognize a first text string associated with the first audio clip, compare the first text string to a plurality of reference text strings associated with a corresponding plurality of reference audio clips to identify a matched one of the reference text strings, and estimate a presentation rate of the first audio clip based on a first time associated with the first audio clip and a second time associated with a first one of the reference audio clips corresponding to the matched one of the reference text strings.

Example 10 includes the at least one non-transitory computer readable medium of example 9, wherein the instructions cause the at least one processor to select the first audio clip from audio data collected by the media meter.

Example 11 includes the at least one non-transitory computer readable medium of example 9, wherein the instructions cause the at least one processor to determine match scores associated with corresponding ones of the reference text strings, the match scores based on comparisons of the first text string to the corresponding ones of the reference text strings.

Example 12 includes the at least one non-transitory computer readable medium of example 11, wherein the match scores represent strengths of the matches between the first text string and the corresponding ones of the reference text strings.

Example 13 includes the at least one non-transitory computer readable medium of example 9, wherein the instructions cause the at least one processor to estimate the presentation rate based on a ratio of the first time and the second time.

Example 14 includes the at least one non-transitory computer readable medium of example 9, wherein the presentation rate is a first presentation rate, and wherein the instructions cause the at least one processor is to estimate a plurality of presentation rates based on a first plurality of times associated with a plurality of audio clips and a second plurality of times associated with ones of the reference audio clips with the reference text strings determined to match a plurality of text strings associated with the plurality of audio clips.

Example 15 includes the at least one non-transitory computer readable medium of example 14, wherein the instructions cause the machine to average the first presentation rate and the plurality of presentation rates to determine a resultant presentation rate.

Example 16 includes the at least one non-transitory computer readable medium of example 15, wherein the instructions cause the at least one processor to output the resultant presentation rate for adjusting a signature generation procedure based on the resultant presentation rate to credit exposure of the first audio clip to a media asset.

Example 17 includes a method comprising performing speech recognition on a first audio clip collected by a media meter to recognize a first text string associated with the first audio clip, comparing, by executing an instruction with at least one processor, the first text string to a plurality of reference text strings associated with a corresponding plurality of reference audio clips to identify a matched one of the reference text strings, and estimating, by executing an instruction with the at least one processor, a presentation rate of the first audio clip based on a first time associated with the first audio clip and a second time associated with a first one of the reference audio clips corresponding to the matched one of the reference text strings.

Example 18 includes the method of example 17, further including selecting the first audio clip from audio data collected by the media meter.

Example 19 includes the method of example 17, further including determining match scores associated with corresponding ones of the reference text strings, the match scores based on comparisons of the first text string to the corresponding ones of the reference text strings.

Example 20 includes the method of example 19, wherein the match scores represent strengths of the matches between the first text string and the corresponding ones of the reference text strings.

Example 21 includes the method of example 17, further including estimating the presentation rate based on a ratio of the first time and the second time.

Example 22 includes the method of example 17, wherein the presentation rate is a first presentation rate, and further including estimating a plurality of presentation rates based on a first plurality of times associated with a plurality of audio clips and a second plurality of times associated with ones of the reference audio clips with the reference text strings determined to match a plurality of text strings associated with the plurality of audio clips.

Example 23 includes the method of example 22, further including averaging the first presentation rate and the plurality of presentation rates to determine a resultant presentation rate.

Example 24 includes the method of example 23, further including outputting the resultant presentation rate for adjusting a signature generation procedure based on the resultant presentation rate to credit exposure of the first audio clip to a media asset.

Example 25 includes an apparatus comprising a speech determiner to perform speech recognition on a first audio clip collected by a media meter to recognize a first text string associated with the first audio clip, a speech comparer to compare the first text string to a plurality of reference text strings associated with a corresponding plurality of reference audio clips to identify a matched one of the reference text strings, and a media rate detector to estimate a presentation rate of the first audio clip based on a first time associated with the first audio clip and a second time associated with a first one of the reference audio clips corresponding to the matched one of the reference text strings.

Example 26 includes the apparatus of example 25, the apparatus further including an audio selector to select the first audio clip from audio data collected by the media meter.

Example 27 includes the apparatus of example 25, wherein the speech comparer is to determine match scores associated with corresponding ones of the reference text strings, the match scores based on comparisons of the first text string to the corresponding ones of the reference text strings.

Example 28 includes the apparatus of example 27, wherein the match scores represent strengths of the matches between the first text string and the corresponding ones of the reference text strings.

Example 29 includes the apparatus of example 25, wherein the media rate detector is to estimate the presentation rate based on a ratio of the first time and the second time.

Example 30 includes the apparatus of example 25, wherein the presentation rate is a first presentation rate, and the media rate detector is to estimate a plurality of presentation rates based on a first plurality of times associated with a plurality of audio clips and a second plurality of times associated with ones of the reference audio clips with the reference text strings determined to match a plurality of text strings associated with the plurality of audio clips.

Example 31 includes the apparatus of example 30, wherein the media rate detector is to average the first presentation rate and the plurality of presentation rates to determine a resultant presentation rate.

Example 32 includes the apparatus of example 31, further including a creditor interface to output the resultant presentation rate for adjusting a signature generation procedure based on the resultant presentation rate to credit exposure of the first audio clip to a media asset.

Example 33 includes an apparatus comprising means for performing speech recognition on a first audio clip collected by a media meter to recognize a first text string associated with the first audio clip, means for comparing the first text string to a plurality of reference text strings associated with a corresponding plurality of reference audio clips to identify a matched one of the reference text strings, and means for estimating a presentation rate of the first audio clip based on a first time associated with the first audio clip and a second time associated with a first one of the reference audio clips corresponding to the matched one of the reference text strings.

Example 34 includes the apparatus of example 33, further including means for selecting the first audio clip from audio data collected by the media meter.

Example 35 includes the apparatus of example 33, wherein the means for comparing is to determine match scores associated with corresponding ones of the reference text strings, the match scores based on comparisons of the first text string to the corresponding ones of the reference text strings.

Example 36 includes the apparatus of example 35, wherein the match scores represent strengths of the matches between the first text string and the corresponding ones of the reference text strings.

Example 37 includes the apparatus of example 33, wherein the means for estimating is to estimate the presentation rate based on a ratio of the first time and the second time.

Example 38 includes the apparatus of example 33, wherein the presentation rate is a first presentation rate, and the means for estimating is to estimate a plurality of presentation rates based on a first plurality of times associated with a plurality of audio clips and a second plurality of times associated with ones of the reference audio clips with the reference text strings determined to match a plurality of text strings associated with the plurality of audio clips.

Example 39 includes the apparatus of example 38, wherein the means for estimating is to average the first presentation rate and the plurality of presentation rates to determine a resultant presentation rate.

Example 40 includes the apparatus of example 39, further including means for outputting the resultant presentation rate for adjusting a signature generation procedure based on the resultant presentation rate to credit exposure of the first audio clip to a media asset.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   at least one memory;
   computer readable instructions; and
   processor circuitry to execute the instructions to at least:
   perform speech recognition on a first audio clip of a plurality of collected audio clips, the plurality of collected audio clips collected by a media meter, the speech recognition to recognize a first text string associated with the first audio clip;
   compare the first text string to a plurality of reference text strings associated with a corresponding plurality of reference audio clips to identify a matched one of the reference text strings;
   estimate a plurality of presentation rates based on a first plurality of times associated with the plurality of collected audio clips and a second plurality of times associated with ones of the reference audio clips corresponding to ones of the reference text strings determined to match a plurality of recognized text strings associated with the plurality of collected audio clips, the plurality of presentation rates including a first presentation rate of the first audio clip based on a first time associated with the first audio clip and a second time associated with a first one of the reference audio clips corresponding to the matched one of the reference text strings; and
   average the plurality of presentation rates to determine a resultant presentation rate.

2. The apparatus of claim 1, wherein the at least one processor circuitry is to select the first audio clip from audio data collected by the media meter.

3. The apparatus of claim 1, wherein the processor circuitry is to determine match scores associated with corresponding ones of the reference text strings, the match scores based on comparisons of the first text string to the corresponding ones of the reference text strings.

4. The apparatus of claim 3, wherein the match scores represent strengths of the matches between the first text string and the corresponding ones of the reference text strings.

5. The apparatus of claim 1, wherein the processor circuitry is to estimate the first presentation rate based on a ratio of the first time and the second time.

6. The apparatus of claim 1, wherein the processor circuitry is to output the resultant presentation rate for adjusting a signature generation procedure based on the resultant presentation rate to credit exposure of the first audio clip to a media asset.

7. At least one non-transitory computer readable medium comprising computer readable instructions which, when executed, cause at least one processor to at least:
   perform speech recognition on a first audio clip of a plurality of collected audio clips, the plurality of collected audio clips collected by a media meter, the speech recognition to recognize a first text string associated with the first audio clip;
   compare the first text string to a plurality of reference text strings associated with a corresponding plurality of reference audio clips to identify a matched one of the reference text strings;
   estimate a plurality of presentation rates based on a first plurality of times associated with the plurality of collected audio clips and a second plurality of times associated with ones of the reference audio clips corresponding to ones of the reference text strings determined to match a plurality of recognized text strings associated with the plurality of collected audio clips, the plurality of presentation rates including a first presentation rate of the first audio clip based on a first time associated with the first audio clip and a second time associated with a first one of the reference audio clips corresponding to the matched one of the reference text strings; and
   average the plurality of presentation rates to determine a resultant presentation rate.

8. The at least one non-transitory computer readable medium of claim 7, wherein the instructions are to cause the at least one processor to select the first audio clip from audio data collected by the media meter.

9. The at least one non-transitory computer readable medium of claim 7, wherein the instructions are to cause the at least one processor to determine match scores associated with corresponding ones of the reference text strings, the match scores based on comparisons of the first text string to the corresponding ones of the reference text strings.

10. The at least one non-transitory computer readable medium of claim 9, wherein the match scores represent strengths of the matches between the first text string and the corresponding ones of the reference text strings.

11. The at least one non-transitory computer readable medium of claim 7, wherein the instructions are to cause the at least one processor to estimate the first presentation rate based on a ratio of the first time and the second time.

12. The at least one non-transitory computer readable medium of claim 7, wherein the instructions are to cause the at least one processor to output the resultant presentation rate for adjusting a signature generation procedure based on the resultant presentation rate to credit exposure of the first audio clip to a media asset.

13. A method comprising:
   performing speech recognition on a first audio clip of a plurality of collected audio clips, the plurality of collected audio clips collected by a media meter, the speech recognition to recognize a first text string associated with the first audio clip;
   comparing, by executing an instruction with at least one processor, the first text string to a plurality of reference text strings associated with a corresponding plurality of reference audio clips to identify a matched one of the reference text strings;
   estimating, by executing an instruction with the at least one processor, a plurality of presentation rates based on a first plurality of times associated with the plurality of collected audio clips and a second plurality of times associated with ones of the reference audio clips corresponding to ones of the reference text strings determined to match a plurality of recognized text strings associated with the plurality of collected audio clips, the plurality of presentation rates including a first presentation rate of the first audio clip based on a first time associated with the first audio clip and a second time associated with a first one of the reference audio clips corresponding to the matched one of the reference text strings; and
   averaging, by executing an instruction with the at least one processor, the plurality of presentation rates to determine a resultant presentation rate.

14. The method of claim 13, further including determining match scores associated with corresponding ones of the reference text strings, the match scores based on comparisons of the first text string to the corresponding ones of the reference text strings.

15. The method of claim 14, wherein the match scores represent strengths of the matches between the first text string and the corresponding ones of the reference text strings.

16. The method of claim 13, further including estimating the first presentation rate based on a ratio of the first time and the second time.

17. The method of claim 13, wherein the plurality of collected audio clips are collected by the media meter.

18. The method of claim 13, further including outputting the resultant presentation rate for adjusting a signature generation procedure based on the resultant presentation rate to credit exposure of the first audio clip to a media asset.

* * * * *

UNITED STATES PATENT AND TRADEMARK OFFICE
CERTIFICATE OF CORRECTION

| | | |
|---|---|---|
| PATENT NO. | : 11,683,558 B2 | Page 1 of 1 |
| APPLICATION NO. | : 17/565349 | |
| DATED | : June 20, 2023 | |
| INVENTOR(S) | : Morris Lee | |

It is certified that error appears in the above-identified patent and that said Letters Patent is hereby corrected as shown below:

In the Claims

Column 31, Line 34 (Claim 2), delete "at least one"

Signed and Sealed this
Twenty-fourth Day of October, 2023

Katherine Kelly Vidal
*Director of the United States Patent and Trademark Office*